United States Patent [19]

Margolin

[11] Patent Number: 5,553,229
[45] Date of Patent: *Sep. 3, 1996

[54] ROW ADDRESSABLE GRAPHICS MEMORY WITH FLASH FILL

[76] Inventor: Jed Margolin, 3570 Pleasant Echo Dr., San Jose, Calif. 95148

[*] Notice: The term of this patent shall not extend beyond the expiration date of Pat. No. 5,422,998.

[21] Appl. No.: 398,994

[22] Filed: Mar. 6, 1995

Related U.S. Application Data

[63] Continuation of Ser. No. 153,200, Nov. 15, 1993, Pat. No. 5,422,998.

[51] Int. Cl.$^6$ .................................................... G06F 12/06
[52] U.S. Cl. .................... 395/166; 395/410; 345/196; 345/200; 365/230.01; 365/230.08
[58] Field of Search ................................ 395/162–166, 395/410, 411; 345/185, 196, 189, 200, 190; 365/189.01, 189.04, 189.05, 230.01, 230.03, 230.05, 230.08, 230.09, 230.12, 219

[56] References Cited

U.S. PATENT DOCUMENTS

| | | | |
|---|---|---|---|
| 4,498,155 | 2/1985 | Mohan Rao | 365/230.09 |
| 4,546,451 | 10/1985 | Bruce | 395/166 |
| 4,639,890 | 1/1987 | Heilveil et al. | 345/190 |
| 4,644,502 | 2/1987 | Kawashima | 365/219 |
| 4,646,270 | 2/1987 | Voss | 365/189.02 |
| 4,648,077 | 3/1987 | Pinkham et al. | 365/189.12 |
| 4,663,735 | 5/1987 | Novak et al. | 345/190 |
| 4,688,197 | 8/1987 | Novak et al. | 365/189.12 |
| 4,689,741 | 8/1987 | Redwine et al. | 345/190 |
| 4,719,601 | 1/1988 | Gray et al. | 365/189.02 |
| 4,747,081 | 5/1988 | Heilveil et al. | 365/219 |
| 4,789,960 | 12/1988 | Willis | 395/550 |
| 4,817,051 | 3/1989 | Chang | 365/154 |
| 4,821,226 | 4/1989 | Christopher et al. | 365/230.03 |
| 4,825,411 | 4/1989 | Hamano | 365/189.04 |
| 4,833,649 | 5/1989 | Greub | 365/189.06 |
| 4,858,190 | 8/1989 | Yamaguchi et al. | 365/189.05 |
| 4,866,678 | 9/1989 | Pinkham et al. | 365/230.01 |
| 4,870,621 | 9/1989 | Nakada | 365/230.05 |
| 4,891,794 | 1/1990 | Hush et al. | 365/189.04 |
| 4,893,280 | 1/1990 | Gelsomini | 365/230.05 |
| 4,897,818 | 1/1990 | Redwine et al. | 365/221 |
| 4,984,214 | 1/1991 | Hiltebeitel et al. | 365/230.05 |
| 4,987,559 | 1/1991 | Miyauchi et al. | 365/189.04 |
| 5,001,672 | 3/1991 | Ebbers et al. | 365/230.05 |
| 5,023,838 | 6/1991 | Herbert | 365/189.08 |
| 5,042,012 | 8/1991 | Foss | 365/230.04 |
| 5,042,013 | 8/1991 | Sato | 365/230.05 |
| 5,042,014 | 8/1991 | Pinkham et al. | 365/230.05 |
| 5,065,368 | 11/1991 | Gupta et al. | 365/230.05 |
| 5,119,477 | 6/1992 | Ebbers | 395/160 |
| 5,121,360 | 6/1992 | West et al. | 395/230.03 |
| 5,142,637 | 8/1992 | Harlin et al. | 365/230.09 |
| 5,148,523 | 9/1992 | Harlin et al. | 365/230.05 |
| 5,148,524 | 9/1992 | Harlin et al. | 395/166 |
| 5,157,775 | 10/1992 | Sanger | 365/230.05 |
| 5,163,024 | 11/1992 | Heilveil et al. | 365/219 |
| 5,170,157 | 12/1992 | Ishii | 365/189.05 |
| 5,179,372 | 1/1993 | West et al. | 365/230.05 |
| 5,195,056 | 3/1993 | Pinkham et al. | 365/189.05 |
| 5,198,804 | 3/1993 | Mori | 345/185 |
| 5,201,037 | 4/1993 | Kohiyama et al. | 395/164 |
| 5,210,639 | 5/1993 | Redwine et al. | 395/164 |
| 5,422,998 | 6/1995 | Margolin | 395/166 |

OTHER PUBLICATIONS

Electronic News; Oct. 4, 1993; p. 20, "IBM, Siemens Sample 64M DRAM".

Primary Examiner—Kee Mei Tung
Attorney, Agent, or Firm—Blakely, Sokoloff, Taylor & Zafman

[57] ABSTRACT

A single-chip semiconductor memory device optimized for high performance flat-shaded polygon video systems consists of a RAM with flash fill circuitry whereby the Start and End addresses are specified for a given row; the data within this range are read, modified, and written back to the memory in parallel thereby requiring a maximum of three memory cycles to fill a line segment independent of the length of the line. The data are modified according to a function between a color register and the data already present in the memory array, the functions being: AND, OR, EXCLUSIVE OR, or REPLACE.

19 Claims, 20 Drawing Sheets

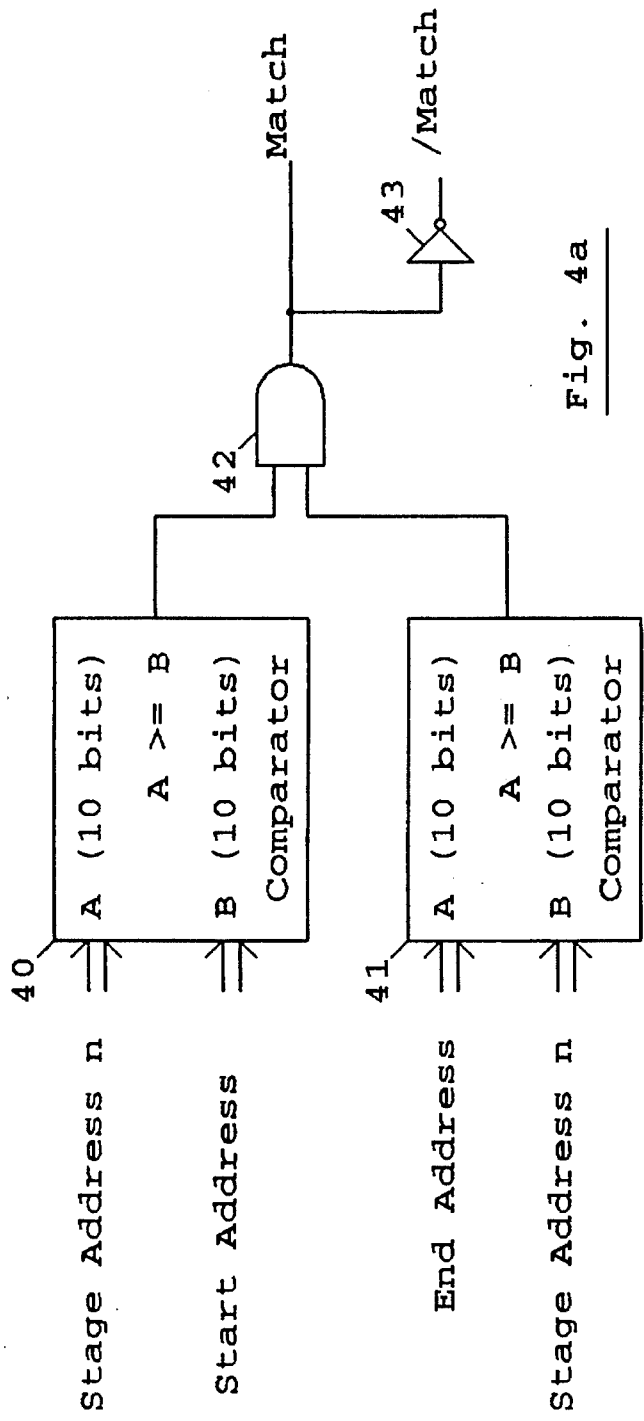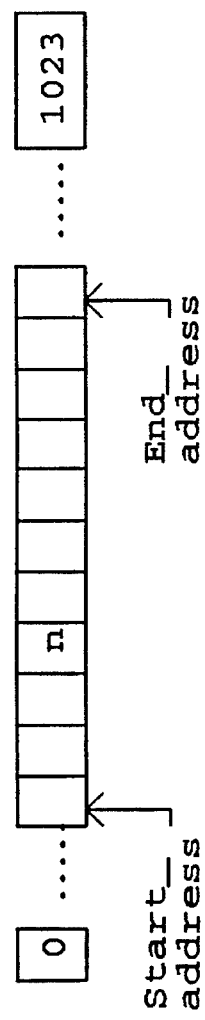
Fig. 4a
Fig. 4b

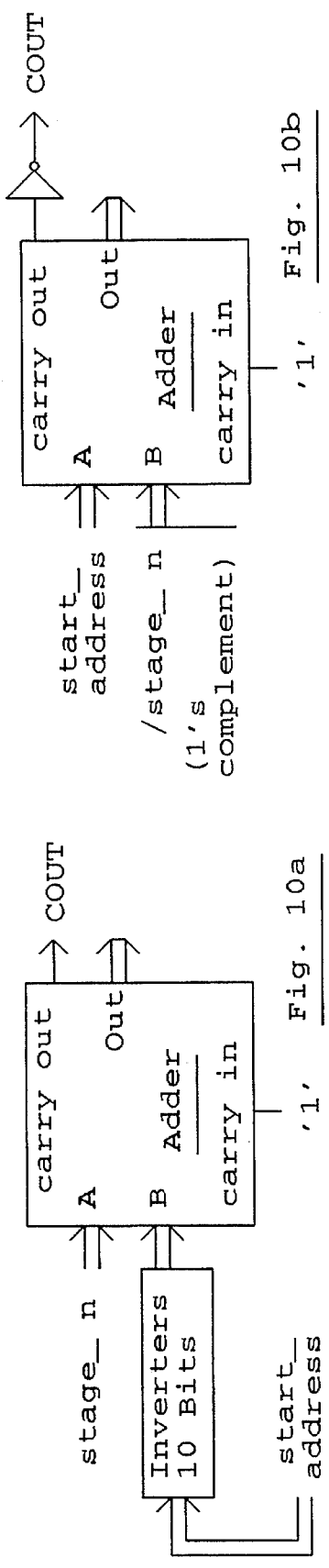
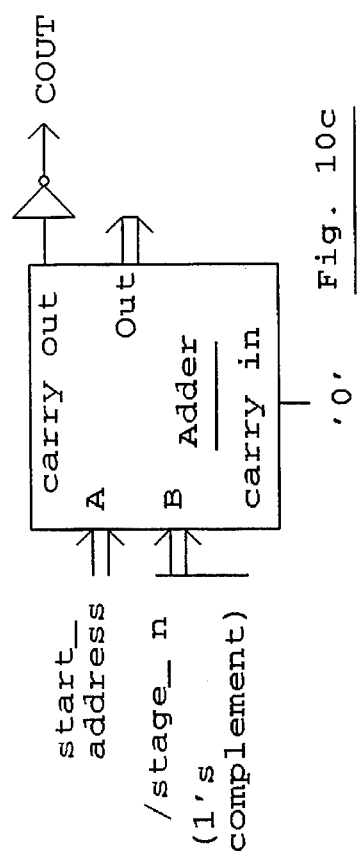
Fig. 10a
Fig. 10b
Fig. 10c

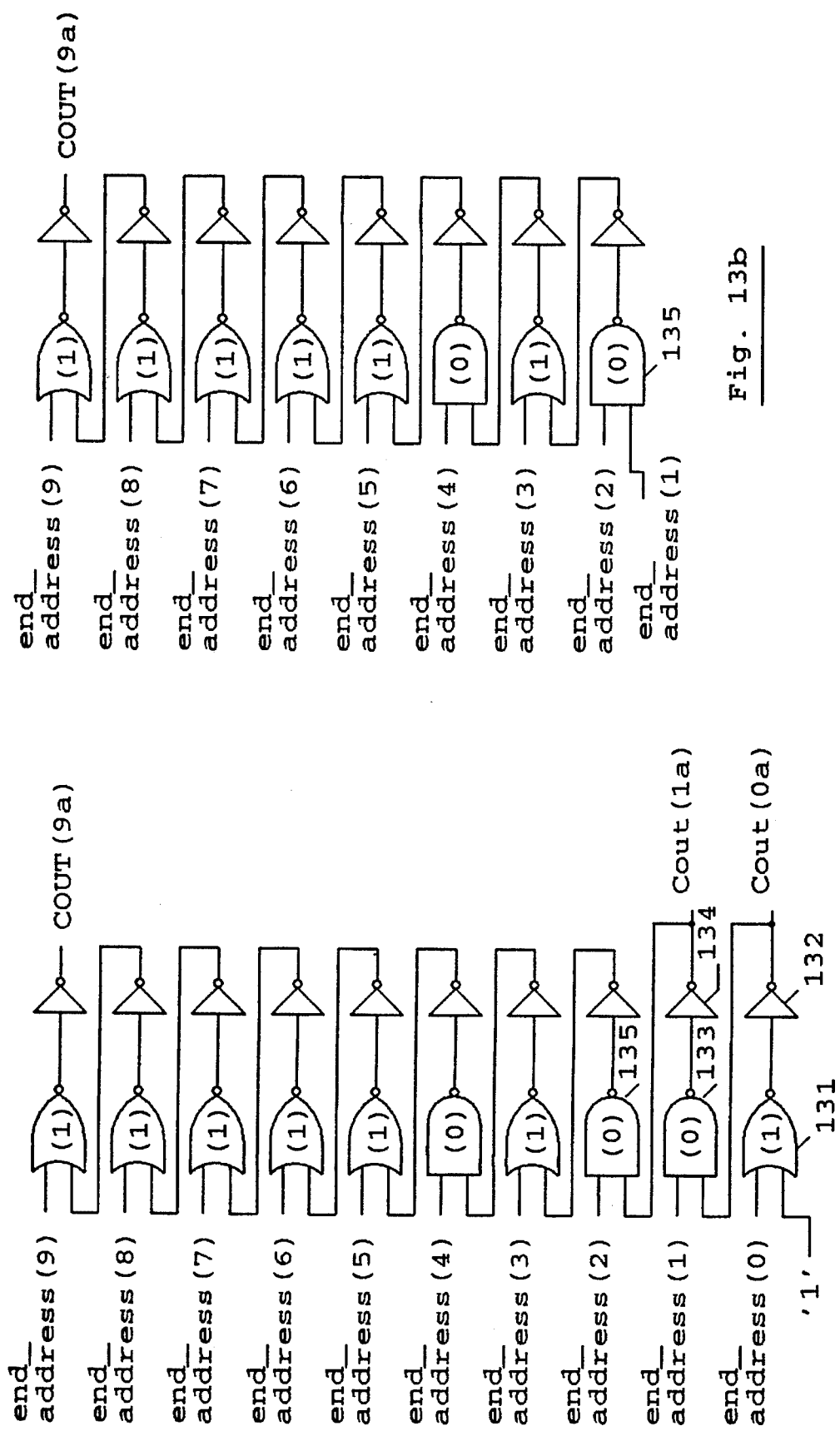

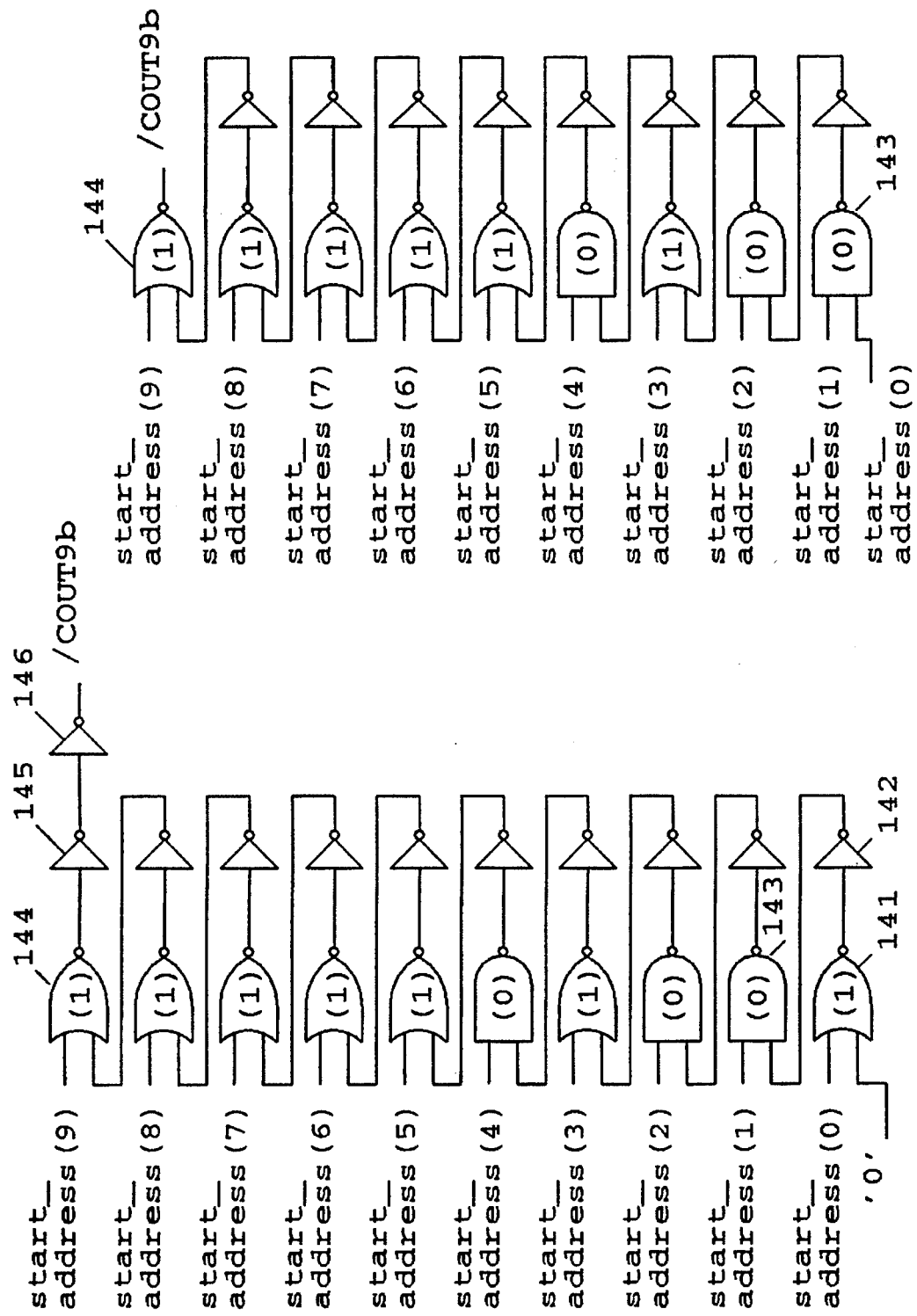

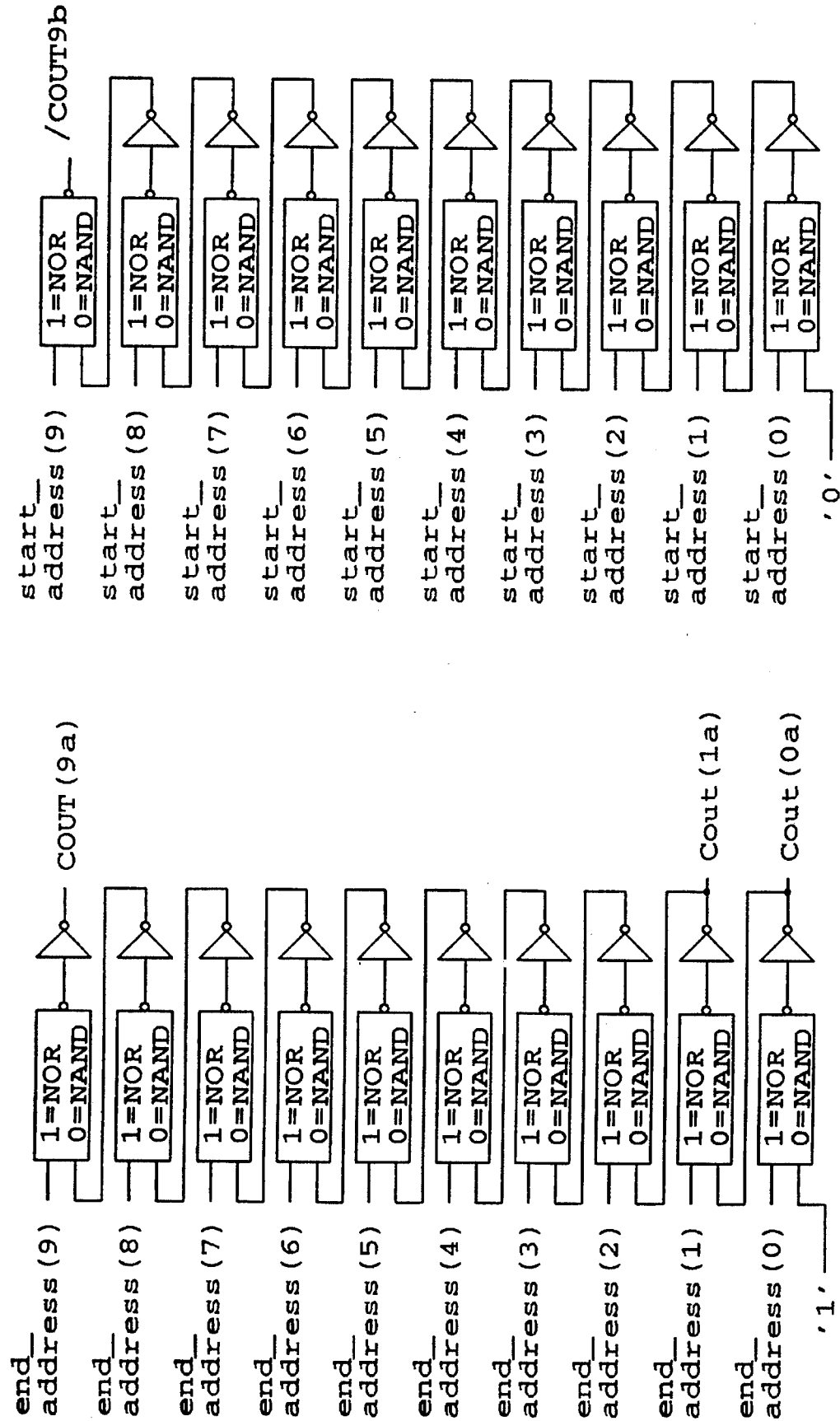

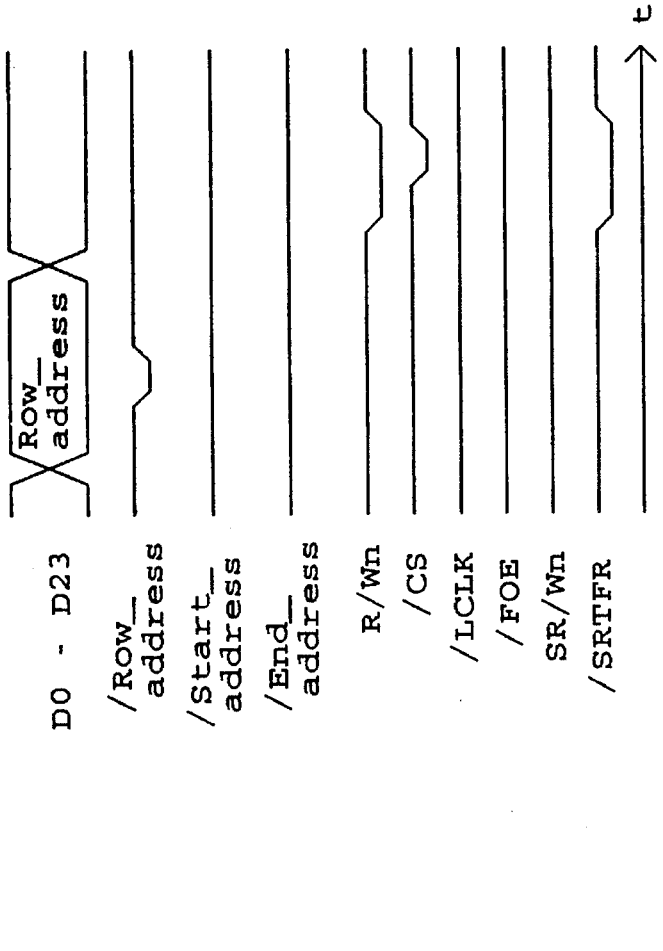
Fig. 18a
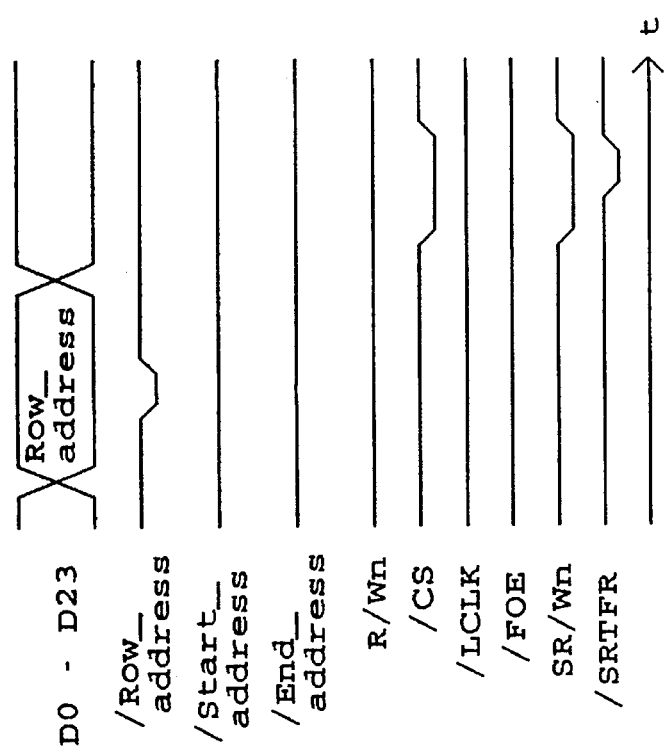
Fig. 18b
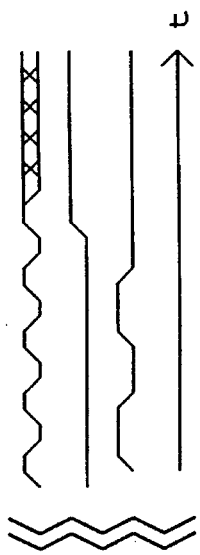
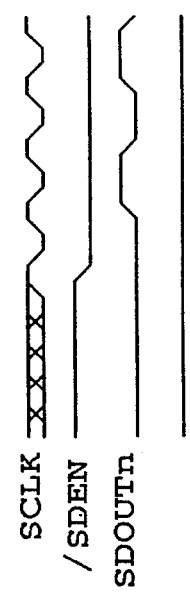
Fig. 18c

ROW ADDRESSABLE GRAPHICS MEMORY WITH FLASH FILL

This is a continuation of application Ser. No. 08/153,200, filed Nov. 15, 1993, now U.S. Pat. No. 5,422,998.

BACKGROUND OF THE INVENTION

This invention relates to a memory device for high performance real-time graphics systems for displaying flat-shaded polygons, typically used for, but not limited to, the display of 3 D graphics. In a 3 D system, objects are composed of polygons defined in three dimensions. The vertices of the polygons are transformed (which may include translation, rotation, and another translation) and an illumination vector may be used to determine the brightness and visibility of each polygons each polygon is then projected and scaled for the display. The result is a list of two dimensional polygons. Each polygon is broken down into a series of horizontal lines having the appropriate Start and End addresses. A bit-mapped frame buffer is filled by writing the color data between the Start and End addresses. These techniques are well known to those skilled in the art.

A high performance real-time graphics system requires being able to write a large number of pixels in a short amount of time. This is done through a combination of writing many pixels in parallel in a memory with a short access time. However, as memories get larger a system requires fewer of them so there are fewer that can be written in parallel.

As an example, when memories were relatively small, say 64K×1, a 1024×768×8 frame buffer would have required 96 memories. By organizing them as 12 groups of eight memories each they could be interleaved so that with the appropriate circuitry up to 12 pixels could be written in a single memory cycle.

With larger memories now available as 256K×8, a 1024×768×8 frame buffer would require 3 memories; However, only one pixel can be written at a time.

Although the new memories are faster (60 ns for the new versus 150 ns for the old) it is not enough to make up for the loss of parallelism.

Currently, a high performance frame buffer would be 1024×768×24 which would require nine 256K×8 memories. Again, only one pixel could be written at a time.

Conventional dynamic video RAMs combine a memory array with a shift register so that an entire line of video can be transfeted to the shift register in one operation so that the video can be shifted out to the video display while leaving the memory array free to accept new data. A video RAM with a shift register does not increase the number of pixels that can be written in parallel.

The 1985 patent to Rao (U.S. Pat. No. 4,498,155) shows a dynamic memory array with a shift register that allows for parallel transfers of data between the shift register and the selected memory row. Once loaded from the memory the data in the shift register can be read out independently of the memory array.

The 1985 patent to Bruce (U.S. Pat. No. 4,546,451) sets forth a dynamic RAM which permits "page mode" addressing.

The 1987 patent to Heilveil et al. (U.S. Pat. No. 4,639,890) shows a dual port video memory with selectable cascaded serial shift registers.

The 1987 patent to Kawashima (U.S. Pat. No. 4,644,502) shows a memory device in which data can be read out and/or written-in serially and at a high speed by supplying serial access clock signals thereto, and in which a CPU and the like can achieve random access to any address at a timing independent from that of the serial readout and/or write-in operation.

The 1987 patent to voss (U.S. Pat. No. 4,646,270) sets forth a video graphic dynamic RAM having the capability of serially reading out data at a high rate of speed while performing standard RAM operations.

The 1987 patent to Pinkham et al. (U.S. Pat. No. 4,648,077) shows a dual port video memory with random and serial access ports where control functions are shared in order to minimize the number of pins.

The 1987 patent to Novak et al. (U.S. Pat. No. 4,663,735) shows a A dual port video memory with random and serial access ports where control functions are shared in order to minimize the number of pins.

The 1987 patent to Novak et al. (U.S. Pat. No. 4,688,197) sets forth a video computer system having a RAM chip with a shift register connected to its serial output terminal which is actuated by a first clock and a second clock is utilized to load the serial chip register.

The 1987 patent to Redwine et al. (U.S. Pat. No. 4,689,741) pertains to the same invention as U.S. Pat. No. 4,688,197 but provides for coupling of data between column lines and the chip register to prevent two or more different data bits from simultaneously appearing.

The 1988 patent to Gray et al. (U.S. Pat. No. 4,719,601) shows a dual port video memory with column redundancy for defective columns.

The 1988 patent to Heilveil et al. (U.S. Pat. No. 4,747,081) shows a A dual port video memory using the column address to select the serial shift register tap.

The 1988 patent to Willis (U.S. Pat. No. 4,789,960) shows a dual port memory having semi-synchronous data input and data output.

The 1989 patent to Chang (U.S. Pat. No. 4,817,051) shows a bipolar RAM with separate read and write ports that can be expanded to allow for multiple ports.

The 1989 patent to Christopher et al. (U.S. Pat. No. 4,821,226) shows a dual port video memory having a bit-serial address input port.

The 1989 patent to Hamano (U.S. Pat. No. 4,825,411) shows a dual port memory with two serial access memories.

The 1989 patent to Greub (U.S. Pat. No. 4,833,649) shows a dual port memory that permits two data processing devices to read or write data stored therein at the same time.

The 1989 patent to Yamaguchi et al. (U.S. Pat. No. 4,858,190) shows a dual port video memory with random and serial access ports.

The 1989 patent to Pinkham et al. (U.S. Pat. No. 4,866,678) shows a dual port memory having a pipelined serial output.

The 1989 patent to Nakada (U.S. Pat. No. 4,870,621) shows a dual port video memory with random and serial access ports where the serial read operation can be started from an arbitrary bit location.

The 1990 patent to Hush et al. (U.S. Pat. No. 4,891,794) shows a three port memory having a random access port and two serial ports.

The 1990 patent to Gelsomini et al. (U.S. Pat. No. 4,893,280) shows a dual port video memory with random and serial access ports where the organization of the memory bits can be controlled by the user.

The 1990 patent to Redwine et al. (U.S. Pat. No. 4,897, 818) shows a dual port memory with inhibited random access during transfer cycles.

The 1991 patent to Hiltebeitel et al. (U.S. Pat. No. 4,984,214) shows a dual port memory with improved serial shift register latches.

The 1991 patent to Miyauchi et al. (U.S. Pat. No. 4,987, 559) shows a multiple port video memory with a random access port and two serial access ports to allow serial read and write operations to be performed simultaneously.

The 1991 patent to Ebbers et al. (U.S. Pat. No. 5,001,672) shows a video RAM where the portion of the serial access memory to be scanned can be externally selected.

The 1991 patent to Herbert (U.S. Pat. No. 5,023,838) shows a RAM device capable of performing logic combinations of new and previously stored data in a single memory access cycle. Logic operations are performed by cell or bit.

The 1991 patent to Foss (U.S. Pat. No. 5,042,012) shows a method for serially accessing single or dual port video RAMs by interconnecting and shifting data signals between the existing sense and restore amplifiers of the RAMs according to a master/slave action for serially shifting data out from the RAM.

The 1991 patent to Sato (U.S. Pat. No. 5,042,013) shows a dual port video memory with random and serial access ports with improved sense amplifiers and write amplifiers.

The 1991 patent to Pinkham et al. (U.S. Pat. No. 5,042, 014) shows a pipeline architecture for the serial side of a dual-port memory in order to improve the speed of the speed of the serial output.

The 1991 patent to Gupta et al. (U.S. Pat. No. 5,065,368) shows a dual port video memory that facilitates the selecting from two alternate frame buffers on a per pixel basis.

The 1992 patent to Ebbers (U.S. Pat. No. 5,119,477) shows a video random access memory having a random array and serial buffer employed to speed the replication of structure state information used in the processing of hierarchical graphic data structures.

The 1992 patent to West et al. (U.S. Pat. No. 5,121,360) shows a dual port video memory with random and serial access ports where selected parts of two different rows in a random access memory are transferred simultaneously to the serial access memory via addressable transfer gates under the control of address/control log for the purpose of avoiding mid-line reloads.

The 1992 patent to Harlin et al. (U.S. Pat. No. 5,142,637) shows a dual port video memory with random and serial access ports where the random access port has two modes of access: an image access to a 16 by 1 word (which is a standard parallel data access) and a vector access which allows horizontal or vertical lines to be written within a selected 32 by 32 bit block. The data lines carry start and stop addresses that set Write masks that locate the vector within the 32 by 32 bit block. In the vector mode of operation up to 32 pixel elements stored in memory can be changed in one operation. Vectors that are larger than can fit in a 32 by 32 bit block require additional drawing cycles.

The second 1992 patent to Harlin et al. (U.S. Pat. No. 5,148,523) pertains to the same invention as U.S. Pat. No. 5,142,637.

The third 1992 patent to Harlin et al. (U.S. Pat. No. 5,148,524) pertains to the same invention as U.S. Pat. No. 5,142,637.

The 1992 patent to Sanger (U.S. Pat. No. 5,157,775) shows a dual port, dual speed image memory interface capable of controllably inputting or outputting medium speed data through a medium speed port at the same time that high speed imagery is being supplied to or read from a high speed data rate port.

The 1992 patent to Heilveil et al. (U.S. Pat. No. 5,163, 024) shows a dual port video memory with random and serial access ports where the serial shift register has taps at a plurality of different locations to adapt the system to CRT screens having different resolutions.

The 1992 patent to Ishii (U.S. Pat. No. 5,170,157) shows a dual port video memory with random and serial access ports where the data is divided into two sections in such a way that row data from memory section 1 can be loaded into shift register section 1 while shift register section 2 is displaying data. Similarly, row data from memory section 2 can be loaded into shift register section 2 while shift register section 1 is displaying data. The handoff between shift register sections is seamless. Shifting data into the shift register and reading it into the memory works similarly.

The 1993 patent to West et al. (U.S. Pat. No. 5,179,372) shows a dual port video memory with random and serial access ports where selected parts of two different rows in a random access memory are transferred simultaneously to the serial access memory via addressable transfer gates under the control of address/control log for the purpose of avoiding mid-line reloads. This pertains to the same invention as U.S. Pat. No. 5,121,360.

The 1993 patent to Pinkham et al. (U.S. Pat. No. 5,195, 056) shows a dual port video memory with random and serial access ports where a color register is used in conjunction with a bit mask and block write capability to increase the number of words that can be written simultaneously, typically a maximum of four.

The 1993 patent to Mori (U.S. Pat. No. 5,198,804) shows a dual port video memory with random and serial access ports where the random access memory is wider than the data input terminal; the example given is for a random access memory that is 32 bits wide with a data input terminal that is 16 bits wide. In one operating mode, called image mode, the user supplies the row address, the column address, the upper 16 bits of data, and the lower 16 bits of data. In another operating mode, called vector mode, the user supplies the row address, the column address, and a 16 bit data word that contains the starting and ending bit positions of a 32 bit data mask. The number of pixels that can be written in one operation depends on how many bits are allocated to each pixel and is not specified in the disclosure. However, the maximum number of pixels that can be written in one operation would be 32 if there is only one bit per pixel. If there were eight bits per pixel then only four pixels could be written in one operation.

The 1993 patent to Kohiyama et al. (U.S. Pat. No. 5,201,037) shows a dual port video memory with random and serial access ports where access to the random access port is disabled during transfers from the random access memory to the shift register memory.

The 1993 patent to Redwine et al. (U.S. Pat. No. 5,210, 639) pertains to the same invention as U.S. Pat. No. 4,689, 741.

There is no disclosure in any of the above patents of circuitry to perform massively parallel modification of data in a selected row. The present invention overcomes this limitation by moving the line drawing process into the memory device and by performing all of the pixel writing operations for a given line segment simultaneously where the line segment may be as long as the entire width of the display screen.

SUMMARY OF THE INVENTION

The present invention is a single chip memory containing two screen buffers; each one is 1024×768 by 24 bits deep. The memory is optimized for systems that use flat-shaded polgons which are composed of horizontal line segments having Start and End addresses. In operation, the host system first sets the 24 bit color register and the function to be performed. The host system then selects the Row and the Start and End addresses for each horizontal line segment. The Fill Unit receives all 1024 pixels from the selected row in the memory array simultaneously. Each stage in the Fill Unit compares its address to the Start and End Address provided by the host system; if its address is within that range it modifies the existing pixel data according to the color register and the Function that has been selected. The functions provided are OR, AND, Exclusive OR, and Replace. The pixel data thus modified are written back into the memory array. Pixels that are not within the Start and End Address range are written back into the memory array unmodified.

The memory array is 24 bits deep which typically allocates 8 bits each for Red, Green, and Blue. Since the pixel data is written into the memory array from a color register and since all the selected pixels in a given Row are written simultaneously, the number of bits per pixel has no effect on the rate at which the pixels can be written. This is an improvement over conventional video memories which perform all pixels operations through a random access port which can only write a fixed number of bits at a time so that as the number of bits per pixel increases the number of pixels that can be written simultaneously decreases.

The present invention also includes a Shift Register port of conventional design. During Horizontal Blanking line drawing operations are suspended and a selected row of pixels is loaded into the Shift Register after which line drawing can resume. The data in the Shift Register are then independently shifted out to the video circuitry which typically consists of an eight-bit Digital-to-Analog Converter for each of the three colors to be output to the display.

DESCRIPTION OF THE DRAWINGS

FIG. 4a is a more detailed block diagram showing the Address Compare Unit 30 in FIG. 3.

FIG. 4b shows the relationship between Start_address, End$_{13}$ address, and an arbitrary Stage_n that will produce an address match.

FIG. 10a is a block diagram of a Start_address comparator using a subtractor.

FIG. 10b is an alternate block diagram of a Start_address comparator using a subtractor.

FIG. 10c is a further alternate block diagram of a Start_address comparator using a subtractor.

FIG. 13a is the logic circuit of Comparator 41 for a stage_n address of B#1111101001.

FIG. 13b is the logic circuit for a simplification of Comparator 41 for a stage_n address of B#1111101001.

FIG. 14a is the logic circuit of Comparator 40 for a stage_n address of B#1111101001.

FIG. 14b is the logic circuit for a simplification of Comparator 40 for a stage_n address of B#1111101001.

FIG. 15a is the generalized logic diagram of Comparator 41 for any given stage_n address.

FIG. 15b is the generalized logic diagram of Comparator 40 for any given stage_n address.

FIG. 18a is a timing diagram for a Memory-to-Shift Register Transfer.

FIG. 18b is a timing diagram for a Shift Register-to-Memory Transfer.

FIG. 18c is a timing diagram for enabling and shifting data out of Shift Register 63.

DETAILED SPECIFICATION

Figure 1:
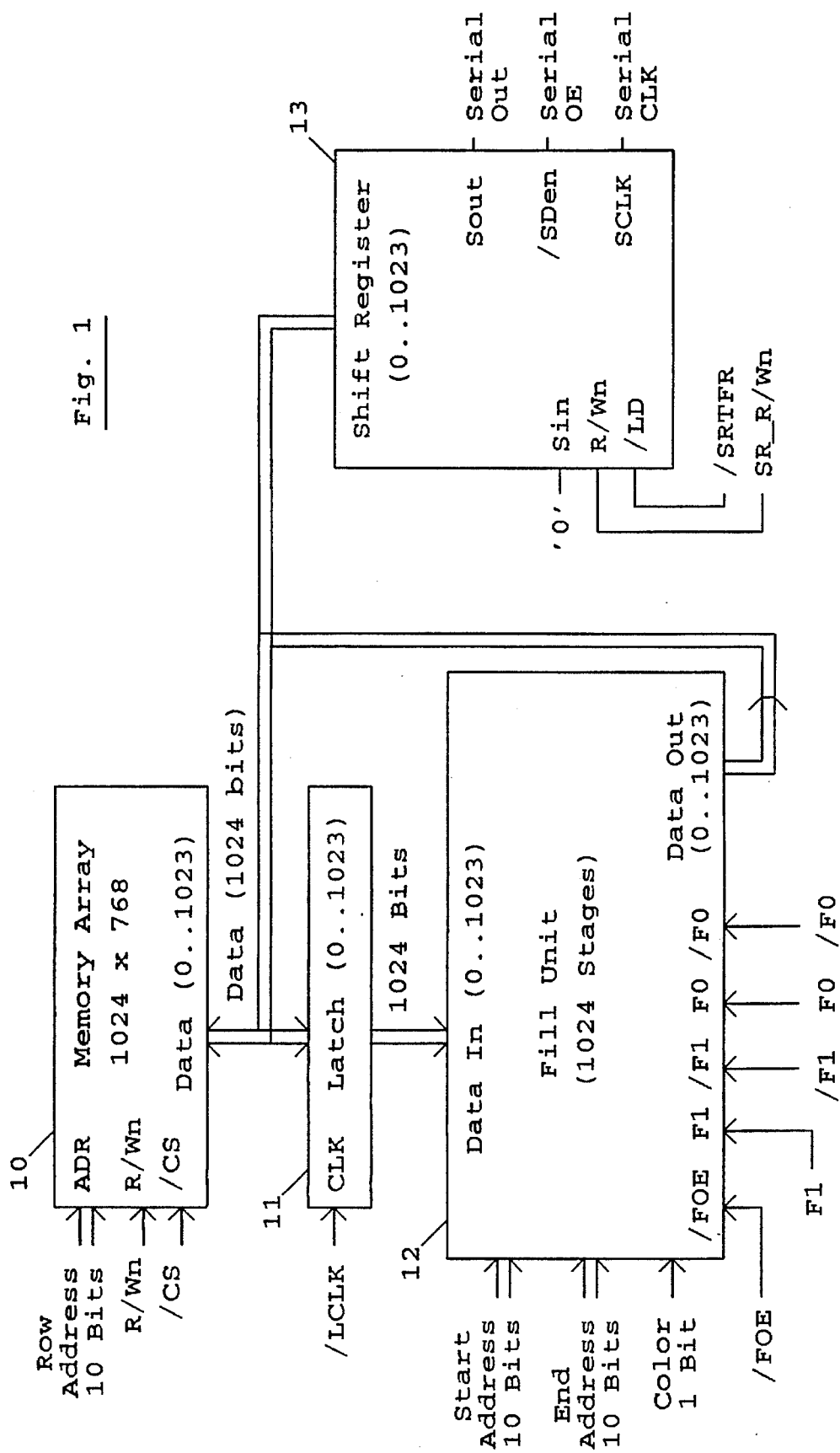
FIG. 1 is a block diagram showing the construction of a single display buffer with one bit-plane.

FIG. 1 shows the basic form of a Flash-Fill Memory simplified by using a single bit plane. Memory Array 10 is organized as 1024 by 768 and contains the row address decoders and sense amplifiers of conventional design. However, all 1024 column data lines are used in parallel and therefore are not further decoded by column address decoders. The basic Flash-Fill operation consists of supplying a Row Address to Memory Array 10 in the Read mode, latching all 1024 output bits in Latch 11, modifying the data in Fill Unit 12, and writing the result back into Memory Array 10 in the Write mode. The data are displayed by using the shift register technique as taught in the volumious prior art by supplying a Row Address to Memory Array 10 and latching the output data into Shift Register 13, after which the data is shifted out to the video display circuitry independently of the operation of the Memory Array.

Figure 2:
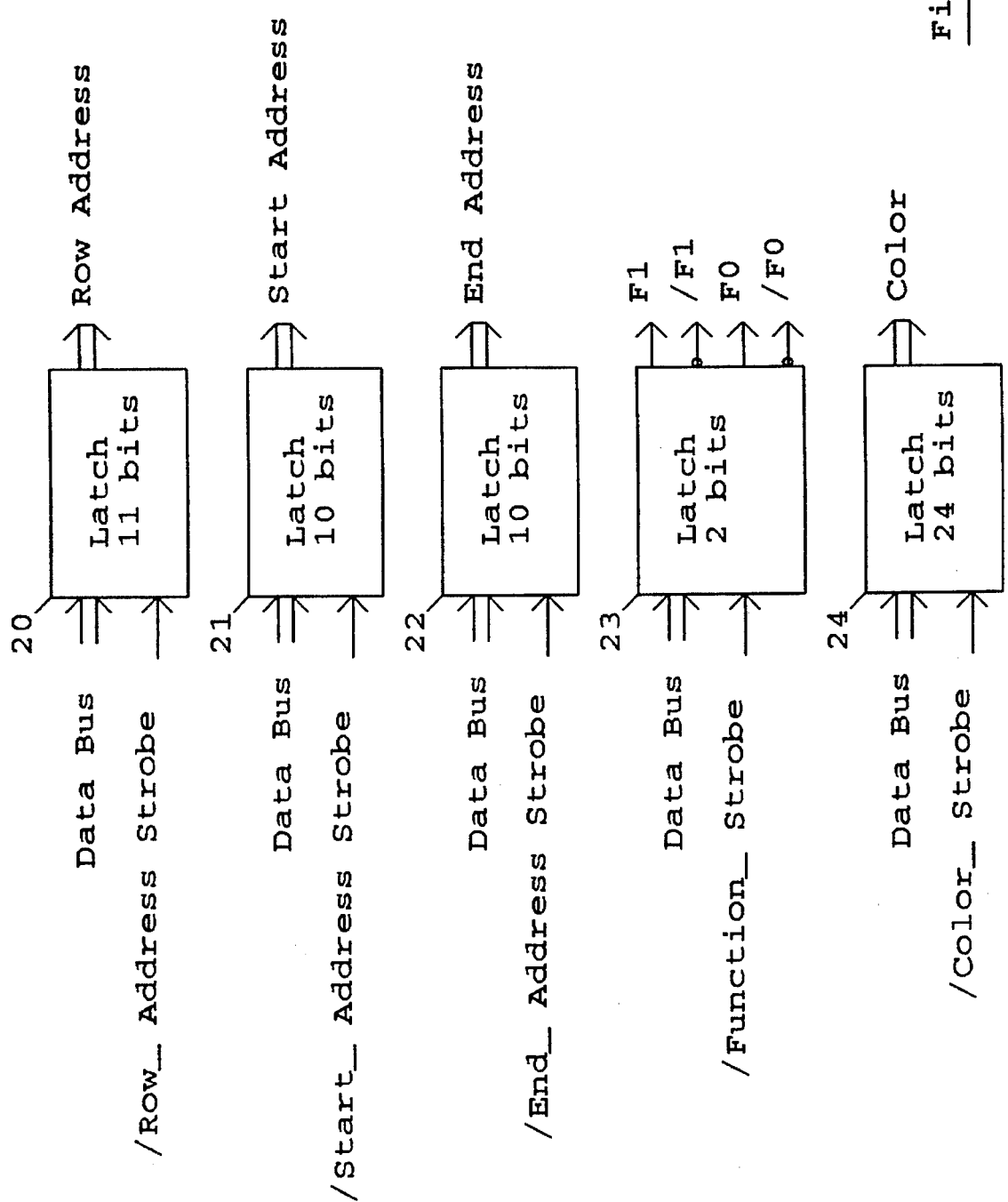
FIG. 2 is a block diagram showing the input latches to interface to a host processor.

FIG. 2 shows the necessary housekeeping for use with a host controller. The Row Address is written into Latch 20. A memory with a single buffer requires 10 bits while a memory with a dual buffer requires 11 bits. The Start Address is written into Latch 21. The End Address is written to Latch 22. The Function to be performed by Fill Unit 12 is written to Latch 23. The Color Data is written to Latch 24. Although 24 bits are shown being latched, only one is used for the single bit plane being discussed.

Figure 3:
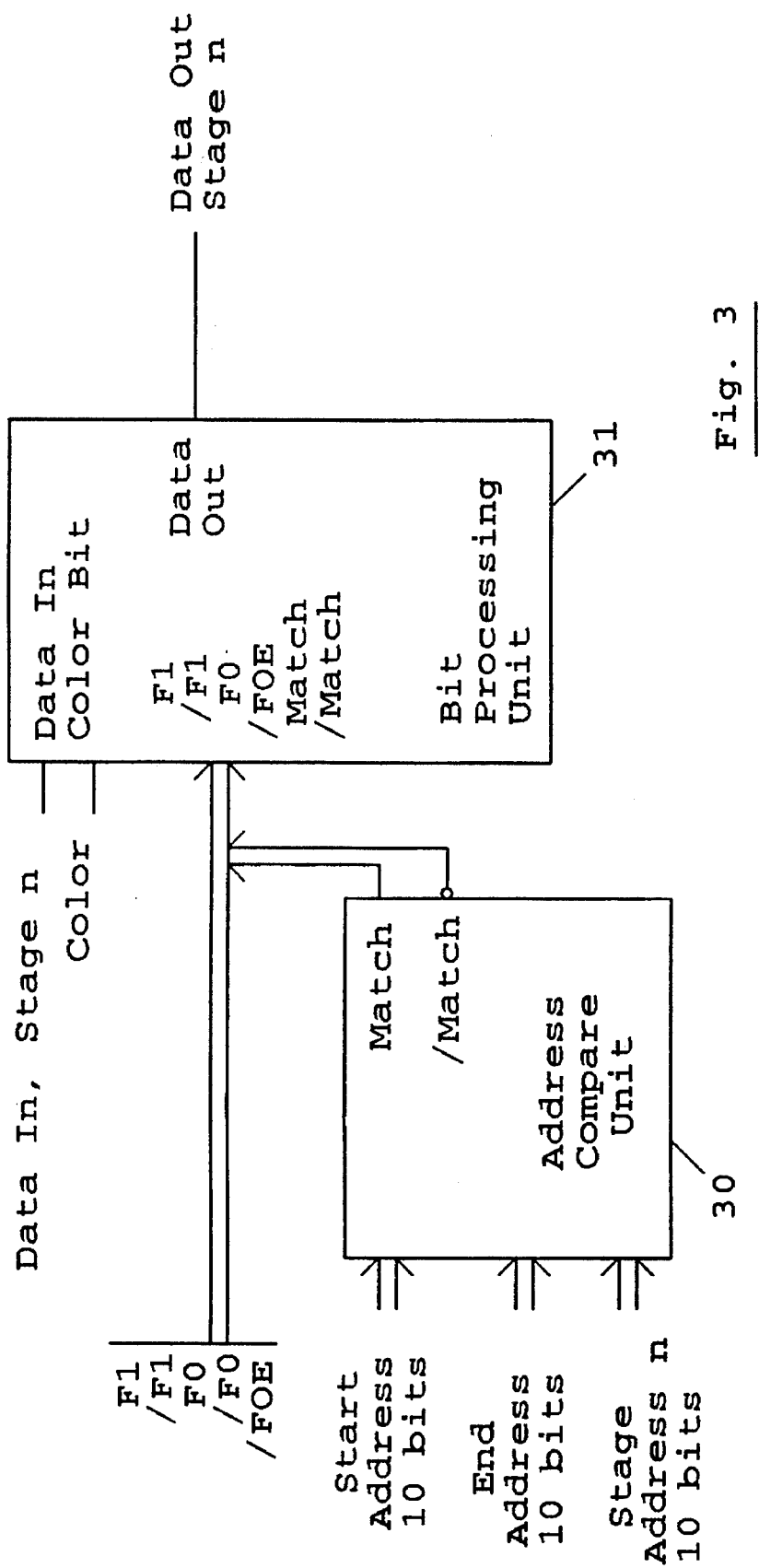
FIG. 3 is a more detailed block diagram showing Fill Unit 12 in FIG. 1.

Each stage of Fill Unit 12 in FIG. 1 is composed of Address Compare Unit 30 and Bit Processing Unit 31 in FIG. 3. Address Compare Unit 30 in FIG. 3 is shown in greater detail in FIG. 4a. Comparator 40 produces an output when the address of Stage_n is greater than or equal to the Start_address. Comparator 41 produces an output when the End_address is greater than or equal to the address of Stage_n. When both of these conditions are true, AND gate 42 produces output 'Match' to indicate that the Stage_n address is greater than or equal to the Start_address and also less than or equal to the End_address. Inverter 43 produces the complement of 'Match'. FIG. 4b shows the relationship between Start_address, End_address, and Stage_n. Since there are 1024 stages, there are 1024 Address Compare Units. The Address Compare Unit for stage 0 has a Stage_n address of '0'. The Address Compare Unit for stage 1 has a Stage_n address of '1'. This continues until the Address Compare Unit for stage 1023 has a Stage_n address of '1023'.

Figure 5:
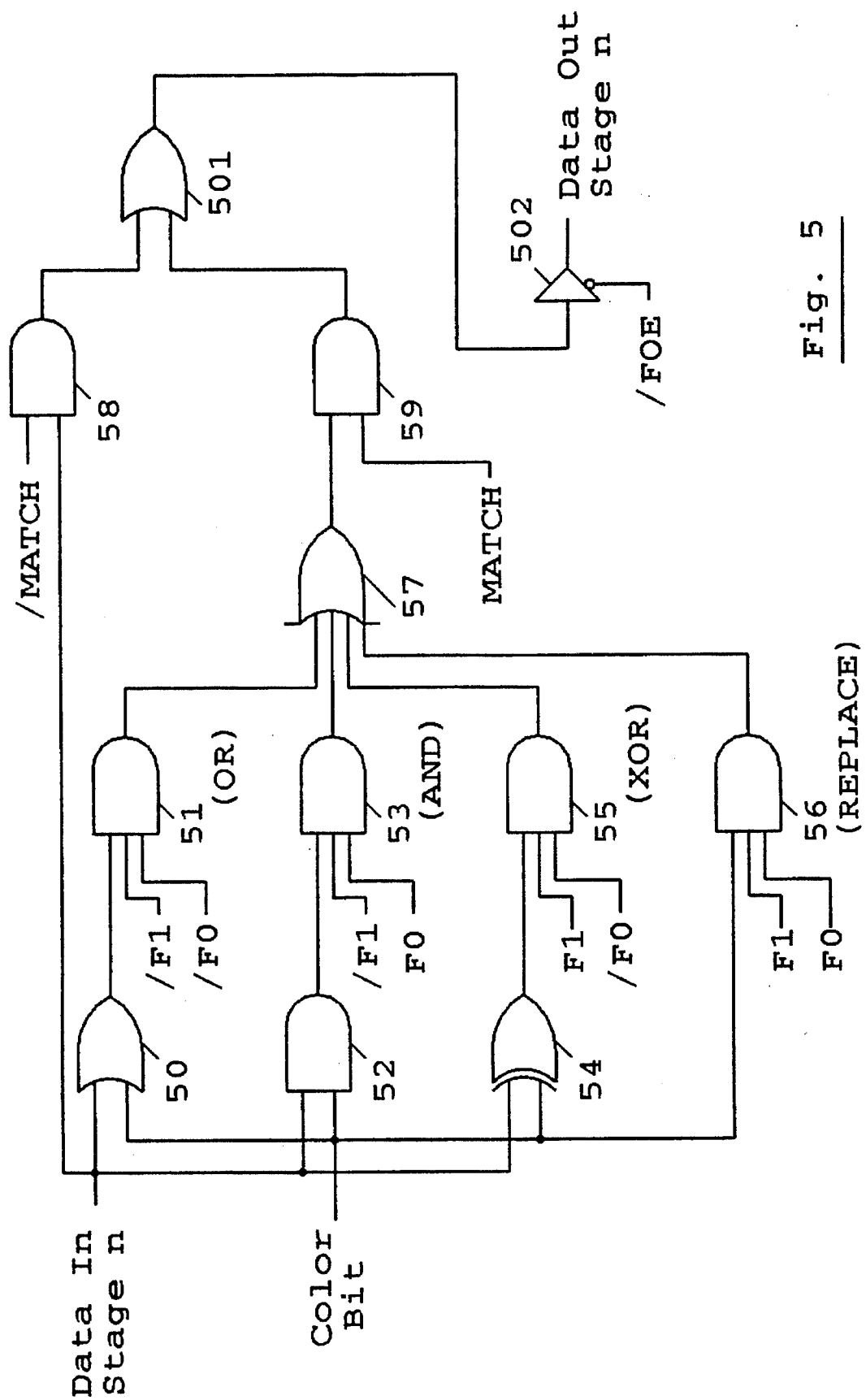
FIG. 5 is a logic diagram of Bit Processing Unit 31 in FIG. 3.

FIG. 5 shows a logic diagram of Bit Processing Unit 31 in FIG. 3. One of the inputs is the Data from Stage_n which is the data from the nth column of Memory Array 10. OR gate 50 ORs the input data with the Color Bit; AND gate 52 ANDs the input data with the Color Bit; and Exclusive OR gate 54 performs an Exclusive OR with the Color Bit. AND gates 51, 53, 55, and 56 select which function to use as determined by inputs F0, /F0, F1, and/F1 from Function Latch 23. AND gate 56 is used to select Data In from Stage_n directly, without modification. Since only one of AND gates 51, 53, 55, and 56 can be selected for a given function of F0, /F0, F1, and/F1, the output of OR gate 57 will contain the Data_In_Stage_n modified by the selected function. When an address match is produced, the modified data is passed through AND gate 59 to OR gate 501. When an address match is not produced the Data_in_Stage_n input is passed by AND gate 58 to OR gate 501 and the modified data present at the input to AND gate 59 is ignored. Gate 502 is a 3-state buffer which is used to place the output data on the bus at the appropriate time so it can be written back into the memory array. FIG. 5 is a typical logic diagram for producing the required result. Other logic arrangements can be devised by those possessing ordinary skill in the art to achieve the same result.

Figure 6:
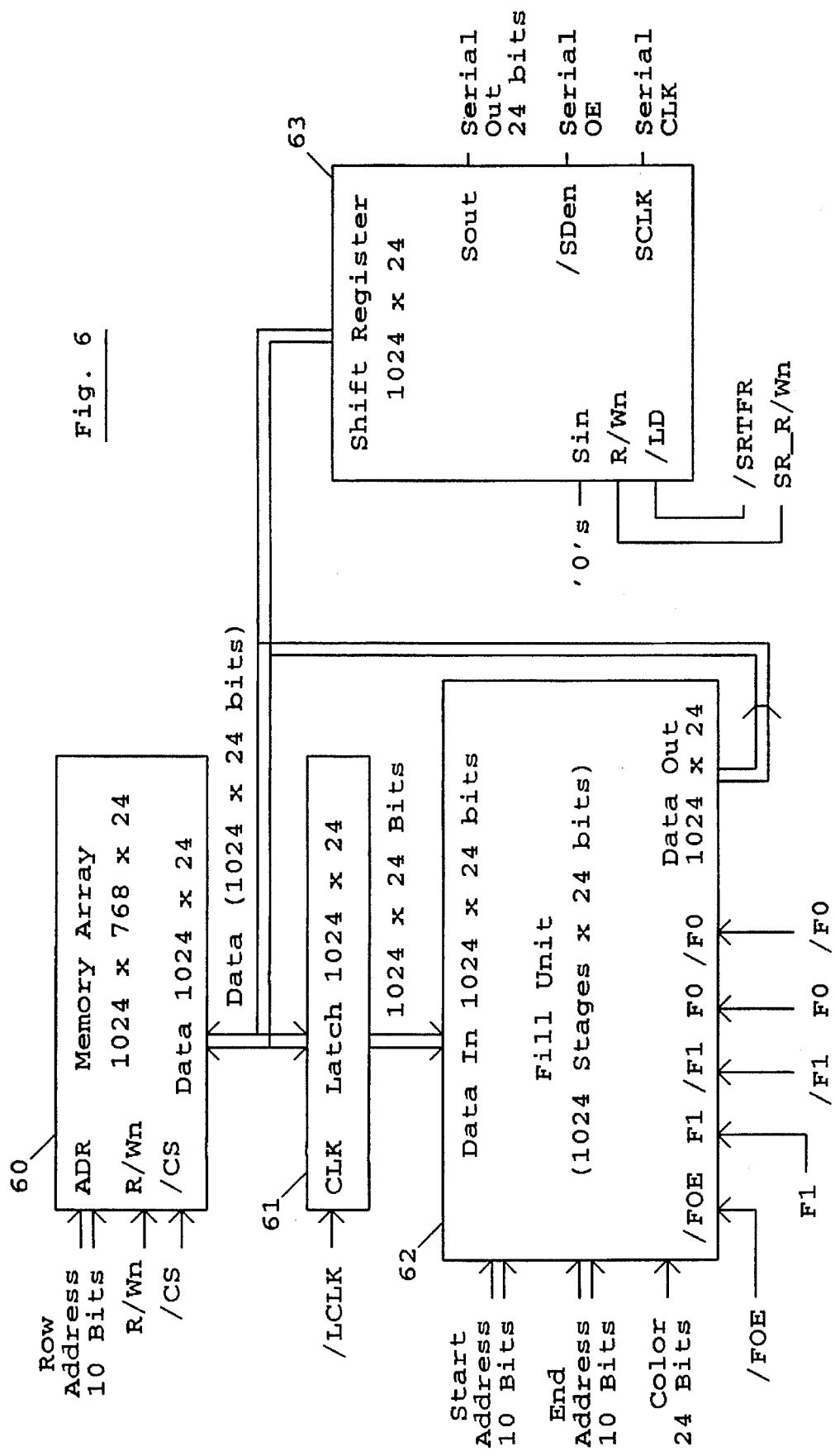
FIG. 6 is a block diagram showing the construction of a single display buffer with 24 bit-planes.

A more useful embodiment for the Flash-Fill Memory contains 24 bit planes as shown in FIG. 6. This permits eight bits of output for Red, Green, and Blue video outputs. In FIG. 6 Memory Array 60 is 1024×768×24, Latch 61 is 1024×24, Shift Register 63 is 1024×24, and Fill Unit 62 is composed of 1024 stages of 24 bits each.

Figure 7:
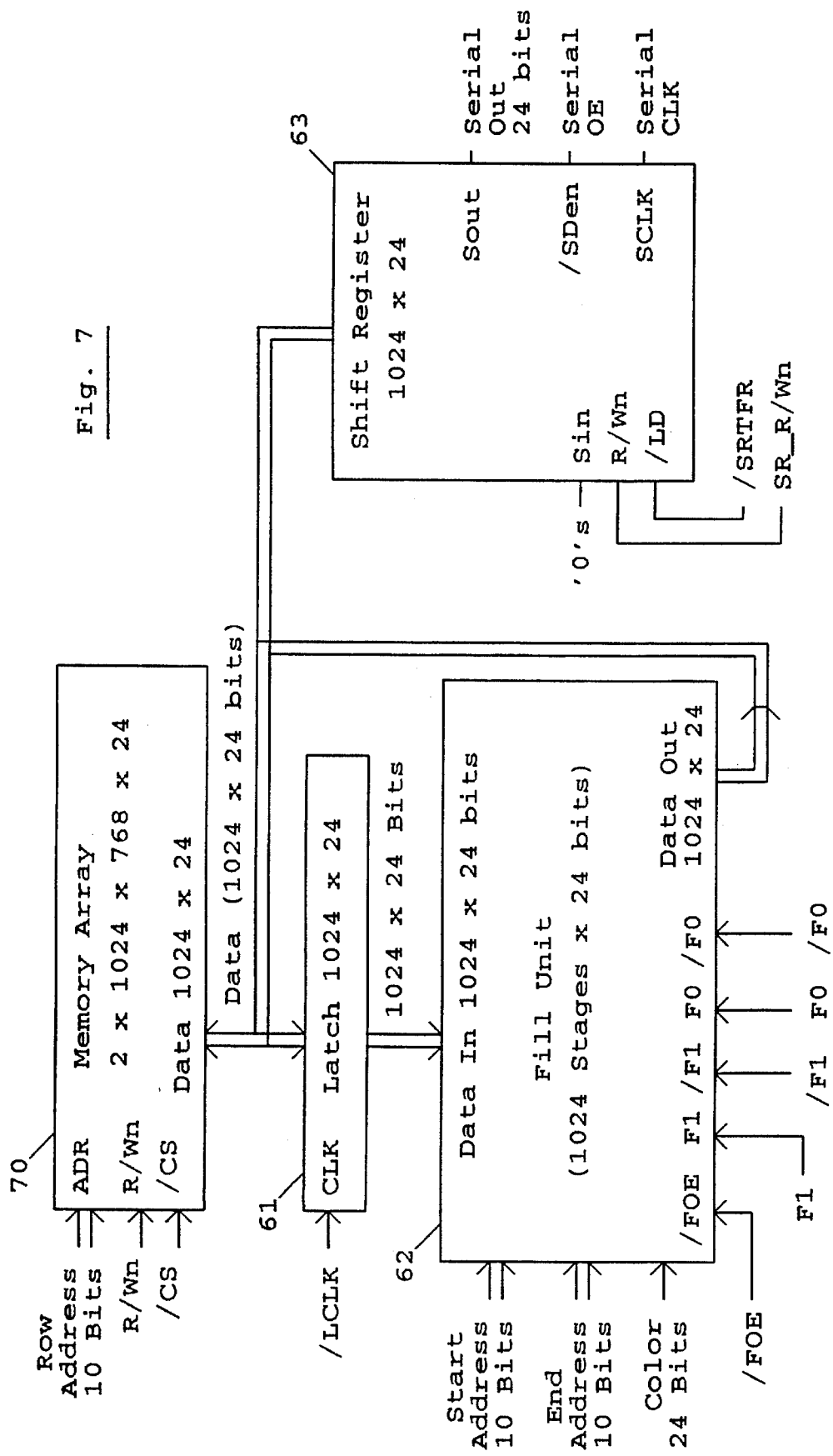
FIG. 7 is a block diagram showing the construction of a dual display buffer with 24 bit-planes.

The preferred embodiment for the Flash-Fill Memory contains two screen buffers that are 24 bits deep as shown in FIG. 7. Memory Array 70 is 2×1024×768×24.

Figure 8:
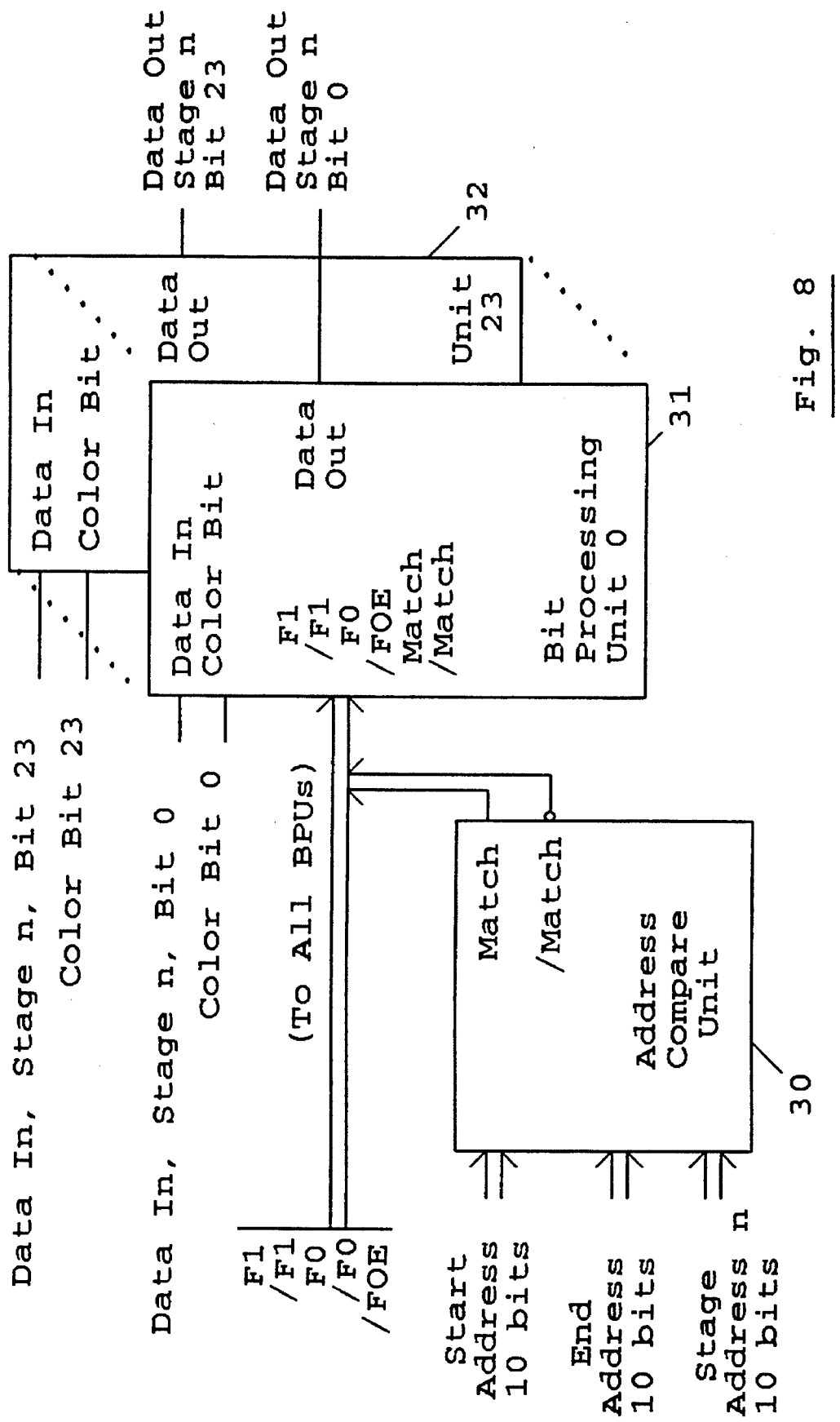
FIG. 8 is a more detailed block diagram showing Fill Unit 62 in FIG. 6 and FIG. 7.

FIG. 8 shows Fill Unit 62 containing 24 bit planes per pixel. Although each bit-plane requires its own Bit Processing Unit, only one Address Compare Unit 30 is needed for each 24-bit pixel. The 24 Bit Processing Units are each identical to the Bit Processing Unit show in FIG. 5. Bit Processing Unit 31 is the first Bit Processing Unit in the stack and Bit Processing Unit 32 is the last Bit Processing Unit in the stack for a total of twenty-four Bit Processing Units.

Figure 9A:
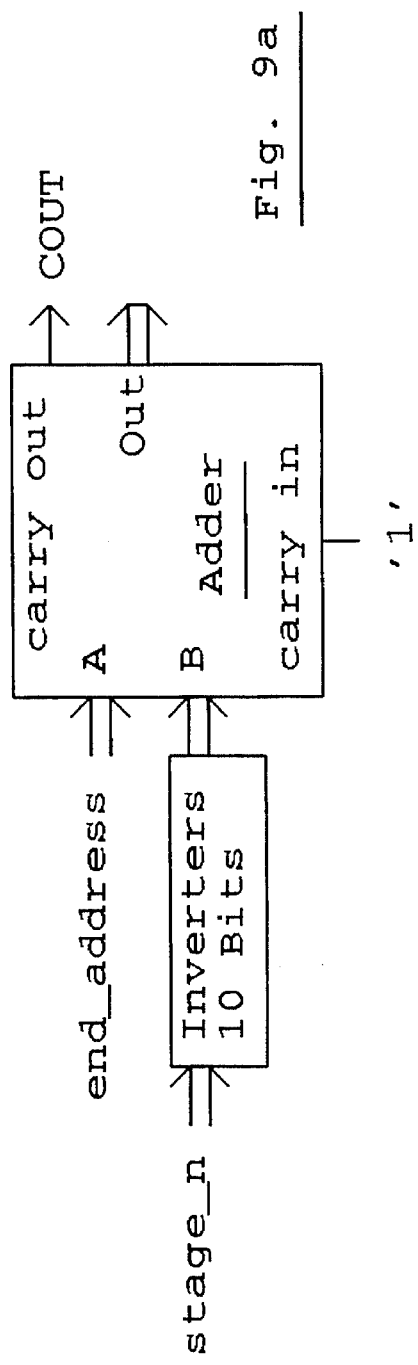
FIG. 9a is a block diagram of an End_address comparator using a subtractor.

The design of digital comparators is well known. However, because of how they are used in this invention they can be made more efficiently. To compare two addresses to find which is greater we can simply subtract them. FIG. 9a shows a subtractor constructed from a standard adder. The two's complement of 'stage_n' is added to 'end_address'. The two's complement of 'stage_n' is formed by inverting the bits ('1's complement) and then adding '1'. Adding '1' is accomplished by setting the carry input of the least significant bit to '1'. The result is that the carry out of the most significant bit will be '1' when 'end_address' is greater than or equal to 'stage_n' and will be '0' when 'end_address' is less than 'stage$_n$'.

Figure 9B:
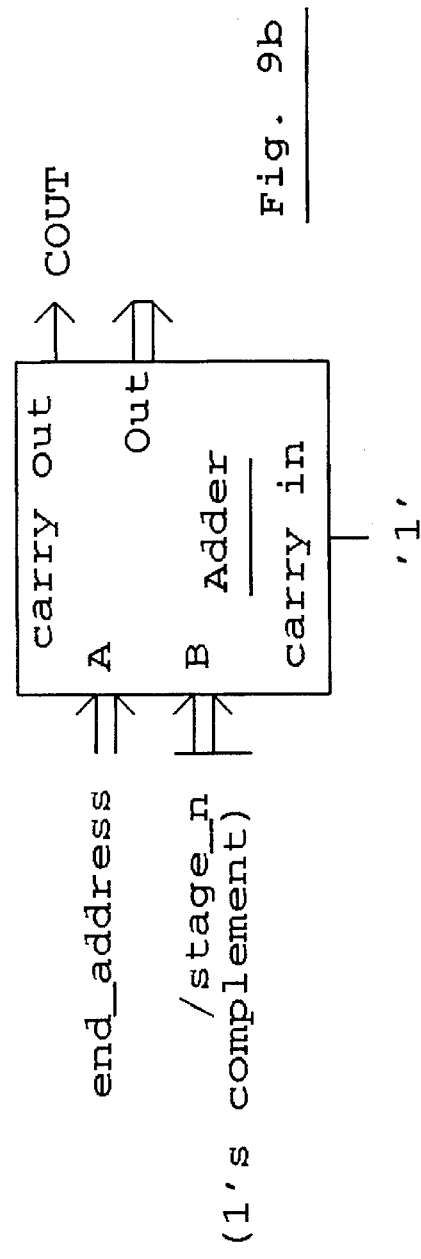
FIG. 9b is an alternate block diagram of an End_address comparator using a subtractor.

Each 'stage_n' is fixed. For example, stage$_{13}$ 22 is always stage_22 (which is H#016 or Binary 00 0001 0110) and is hardwired; its '1's complement can also be hardwired (Binary 11 1110 1001), thereby eliminating the inverter stage. FIG. 9b shows the function 'end_address - stage_n'.

The following example demonstrates comparator operation for 8-bit comparators with 'end_address'=H#65.

| 'stage_n' | 'stage_n' (two's complement) | | | /Cout | stage_n <= end_address |
|---|---|---|---|---|---|
| 64 | 9C | | | 1 | Yes |
| 65 | 9B | | | 1 | Yes |
| 66 | 9A | | | 0 | No |
| 'end_address' | 65 | 65 | 65 | | |
| 'stage_n | + 9C | 9B | 9A | | |
| | 1 01 | 1 00 | 0 FF | | |

The other comparator for each stage must perform the function 'stage_n - start_address' which would require taking the two's complement of the signal 'start_address' (FIG. 10a). If we reverse the function to 'start_address - stage_n' we can use the normal form of 'start$_{13}$address' and the hardwired inverted form of 'stage_n' (FIG. 10b). In this case, the carry out of the most significant bit will be '1' when 'start$_{13}$address' is greater than or equal to 'stage_n" and will be '0' when 'start$_{13}$address' is less than 'stage_n'. If we invert the carry out signal we will have a '1' when 'stage_n' is less than 'start$_{13}$address'. What we need is for it to also be a '1' when 'stage_n' is equal to 'start_address'. This is accomplished by setting the carry in to the least significant bit to '0' (FIG. 10c). This has the effect of decreasing the value of 'stage_n' by one. Therefore the inverted carry out signal will be '1' when 'stage_n' is less than or equal to 'start_address'.

The following example demonstrates comparator operation for 8-bit comparators with 'start_address'=H#22.

| 'stage_n' | 'stage_n' (one's complement) | | | Cout | /Cout | stage_n >= start_address |
|---|---|---|---|---|---|---|
| 21 | DE | | | 1 | 0 | No |
| 22 | DD | | | 0 | 1 | Yes |
| 23 | DC | | | 0 | 1 | Yes |
| 'start_address' | 22 | 22 | 22 | | | |

-continued

| 'stage_n' | 'stage_n' (one's complement) | Cout | /Cout | stage_n >= start_address |
|---|---|---|---|---|
| 'stage_n' | + DE   DD | DC | | |
| | 1 00   0 FF | 0 FE | | |

The logical AND of the carry out of the circuit in FIG. 9b and the inverted carry out of the circuit in FIG. 10c will be '1' when 'stage_n' is greater than or equal to the 'start_address' and is also less than or equal to the end_address'.

Having established that we can perform the required address comparison with standard adders, the next step is to notice that we do not need any outputs other than the carry out of the most significant bit.

A comparator can be made from individual stages that satisfy the logic table in Table 1:

TABLE 1

| A(n) | B(n) | Cin(n) | Cout(n) |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 11B:
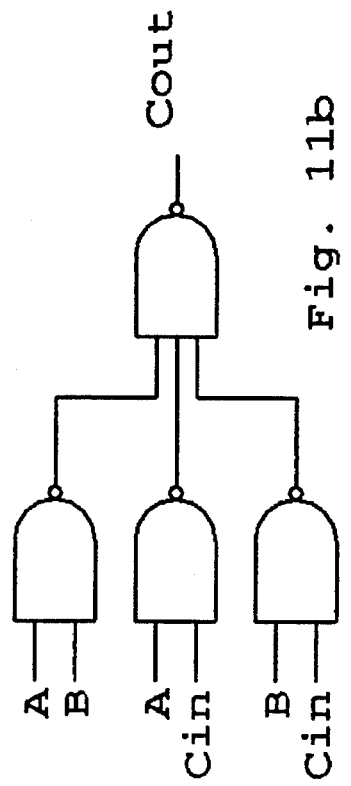
FIG. 11b is the logic circuit for a full 1-bit comparator as it would commonly be implemented in CMOS design.
Figure 11A:
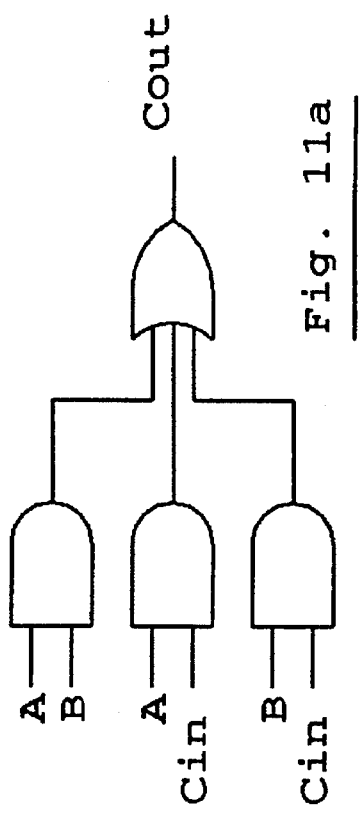
FIG. 11a is the logic circuit for a full 1-bit comparator.

A circuit that performs this logic function is shown in FIG. 11a. FIG. 11b shows the circuit redrawn in the form that would be used in CMOS IC design.

Figure 12B:
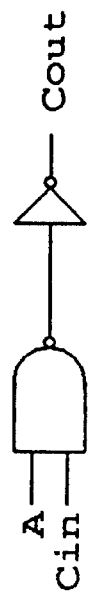
FIG. 12b is a full 1-bit comparator showing how it can be simplified when one of the inputs is permanently set to logic zero.
Figure 12D:
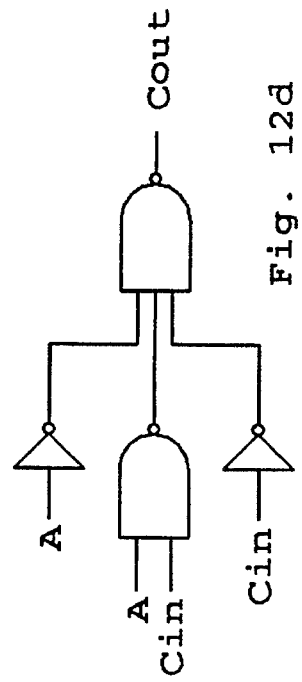
FIG. 12d is a full 1-bit comparator showing how it can be simplified when one of the inputs is permanently set to logic one.
Figure 12A:
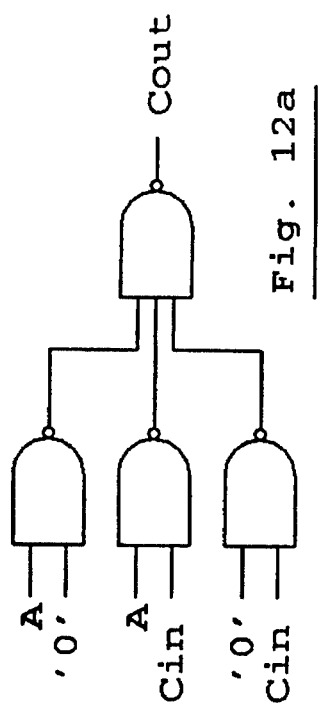
FIG. 12a is the logic circuit for a full 1-bit comparator with one of the inputs permanently set to logic zero.
Figure 12C:
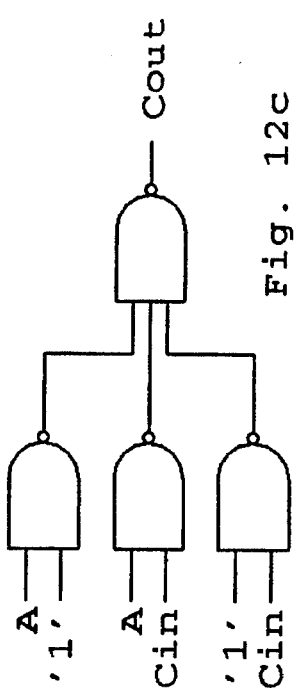
FIG. 12c is the logic circuit for a full 1-bit comparator with one of the inputs permanently set to logic one.
Figure 12E:
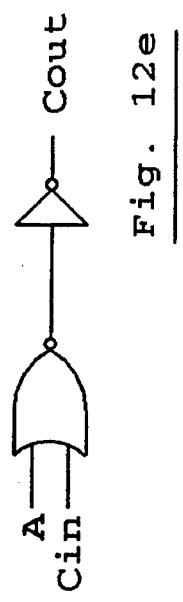
FIG. 12e is a full 1-bit comparator further showing how it can be simplified when one of the inputs is permanently set to logic one.

As we have previously observed, each 'stage_n' is fixed. The '0's and '1's for each bit for each stage_n will not change. For example, for stage_22 (which is Binary 00 0001 0110) each section 1n the comparator the 'B' inputs will be permanently either '0' or '1' and will not change. Therefore, the comparator circuitry can be simplified. A comparator bit that has a stage_n bit of '0' as shown in FIG. 12a can be reduced to the circuit in FIG. 12b. A comparator bit that has a stage_n bit of '1' as shown in FIG. 12c can be reduced to the circuit in FIG. 12d which can be further reduced to the circuit in FIG. 12e.

FIG. 13a shows the comparator for 'stage_n<=end_address'. The '1' input to gate 131 allows gates 131, 132, 133, and 134 to be eliminated with end_address(1) connected to the input to gate 135 as shown in FIG. 13b. The number of gates that can be eliminated depends on the bits in 'stage_n'. Consecutive '1's starting from the least significant bit will allow gates to be eliminated until the first '0' is encountered.

FIG. 14a shows the comparator for 'stage_n >=start_address'. The '0' input to gate 141 allows gates 141 and 142 to be eliminated with start_address(0) connected to the input to gate 143 as shown in FIG. 14b. Gate 145 and 146 can always be eliminated because together they perform a double inversion. The output therefore comes directly from gate 144. This can always be done regardless of the state of any of the inputs and is also shown in FIG. 14b.

The procedure for making the comparator for 'stage_n>= end_address' is shown in FIG. 15a: invert the bits for 'stage_n'; use a NAND gate for the '0' bits and a NOR gate for the '1'; the carry in to the first stage is made '1'.

The procedure for making the comparator for 'stage_n>= start_address' is shown in FIG. 15b: invert the bits for 'stage_n'; use a NAND gate for the '0' bits and a NOR gate for the '1'; the carry in to the first stage is made '0'.

A typical transistor budget for implementation of the dual buffer Flash Fill Video Memory in FIG. 7 using the CMOS process is as follows:

Memory Array 70 using dynamic memory cells: 1 transistor per cell times 1024 columns times 768 rows times 24 bit-planes times 2 buffers =37,748,736 transistors.

Latch 61, static: 10 transistors per bit times 1024 stages times 24 bit-planes=245,760 transistors.

Fill Unit 62: 1024 Address Compare Units 30 and 1024 times 24 Bit Processing Units 31.

Each Address Compare Unit 30 requires 128 transistors. 1024 times 128 transistors=131,072 transistors.

Each Bit Processing Unit 31 requires 96 transistors. 1024 stages times 24 bit-planes times 96 transistors =2,359,296 transistors.

Therefore, the Fill Unit 62 requires 131,072+2,359,296 =2,490,368 transistors.

Shift Register 63, static: 10 transistors per bit times 1024 stages times 24 bit-planes=245,760 transistors.

Transistor Budget Summary for a dual buffer Flash Fill Video Memory using the CMOS process is as follows:

| | |
|---|---|
| Memory Array 70: | 37,748,736 transistors. |
| Latch 61: | 245,760 transistors. |
| Fill Unit 62: | 2,490,368 transistors. |
| Shift Register 63: | 245,760 transistors. |
| Row Address Latch 20: | 110 transistors. |
| Start Address Latch 21: | 100 transistors. |
| End Address Latch 22: | 100 transistors. |
| Function Latch 23: | 48 transistors. |
| Color Latch 24: | 240 transistors. |
| Total: | 40,731,222 transistors |

Forty-One Million transistors are within the range used by the 64 Megabit Dynamic RAMs which, according to "Electronic News" of Oct. 4, 1993, are currently being sampled by. IBM and Siemens AG.

A typical transistor budget for implementation of the single buffer Flash Fill Video Memory in FIG. 6 using the CMOS process is different from the dual buffer memory in that Memory Array 60 is half the size as Memory Array 70 and therefore has half the number of transistors: 1 transistor per cell times 1024 columns times 768 rows times 24 bit-planes=18,874,368 transistors.

Transistor Budget Summary for a single buffer Flash Fill Video Memory using the CMOS process is as follows:

| | |
|---|---|
| Memory Array 60: | 18,874,368 transistors. |
| Latch 61: | 245,760 transistors. |
| Fill Unit 62: | 2,490,368 transistors. |
| Shift Register 63: | 245,760 transistors. |
| Row Address Latch 20: | 110 transistors. |
| Start Address Latch 21: | 100 transistors. |
| End Address Latch 22: | 100 transistors. |
| Function Latch 23: | 48 transistors. |
| Color Latch 24: | 240 transistors. |
| Total: | 21,856,854 transistors |

The 22 Million transistors are well within the range used by the 64 Megabit Dynamic RAMs currently being developed.

Figure 16:
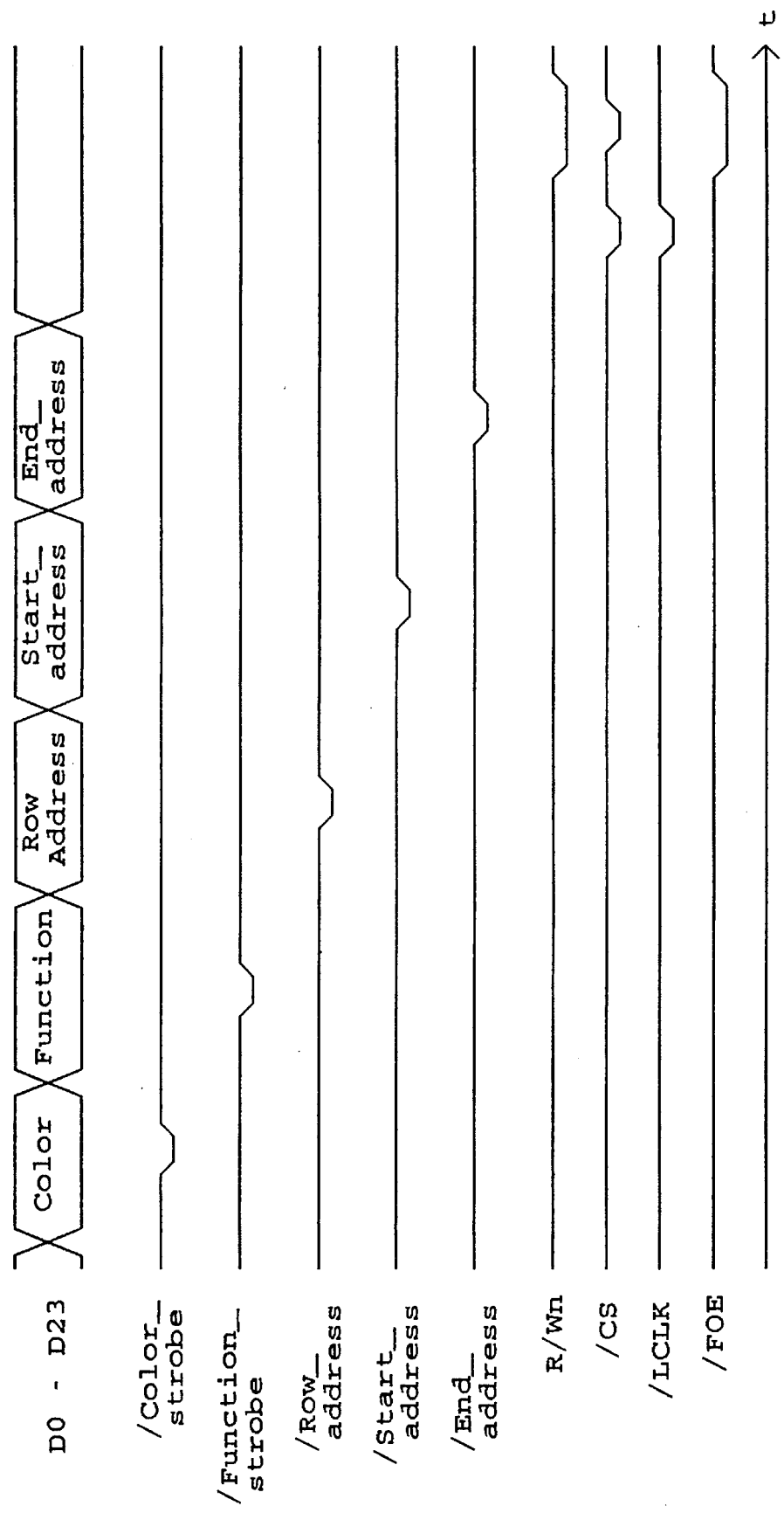
FIG. 16 is a timing diagram for a complete Flash-Fill operation.

The timing for a typical Flash-Fill operation is shown in FIG. 16. The data for Color Latch 24 in FIG. 2 are latched by /Color_Strobe; The data for Function Latch 23 in FIG.

2 are latched by /Function_Strobe; the data for Row Address Latch 20 in FIG. 2 are latched by /Row_address strobe; the data for Start Address Latch 21 in FIG. 2 are latched by /Start-address strobe; and the data for End Address Latch 22 in FIG. 2 are latched by /End_address strobe. R/Wn puts Memory Array 70 in FIG. 7 into the Read Mode and /CS causes Memory Array 70 to perform a Read. The data from Memory Array 70 are latched into Latch 61 in FIG. 7 by /LCLK. The data from Latch 61 are presented to Fill Unit in FIG. 7 where the data in the address range specified by the Start and End_addresses are modified according to the function selected by Function Latch 23 and the data in Color Latch 24, all of which are inputs to Fill Unit 62 in FIG. 7. R/Wn is placed in Write Mode; /FOE is brought low to place the output of Fill Unit 62 on the memory bus; and /CS is strobed to write the output of Fill Unit 62 back into Memory Array 70.

Figure 17:
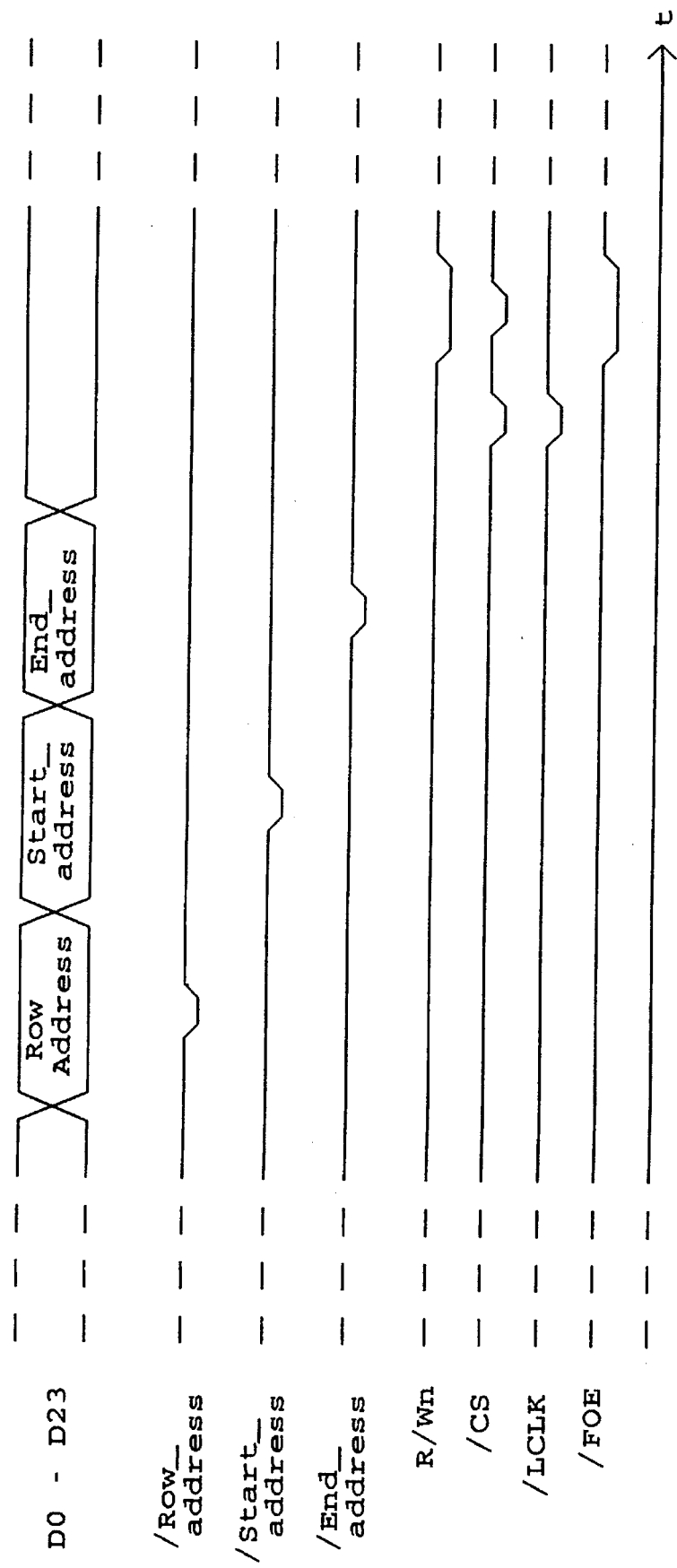
FIG. 17 is a timing diagram for a continuing Flash-Fill operation.

Once Color Latch 24 and Function Latch 23 are set up, additional Flash-Fill operations can be performed as shown in FIG. 17. The data for Row Address Latch 20 in FIG. 2 are latched by /Row_address strobe; the data for Start Address Latch 21 in FIG. 2 are latched by /Start-address strobe; and the data for End Address Latch 22 in FIG. 2 are latched by /End_address strobe. R/Wn puts Memory Array 70 in FIG. 7 into the Read Mode and /CS causes Memory Array 70 to perform a Read. The data from Memory Array 70 are latched into Latch 61 in FIG. 7 by /LCLK. The data from Latch 61 are presented to Fill Unit 62 in FIG. 7 where the data in the address range specified by the Start and End addresses are modified according to the function selected by Function Latch 23 and the data in Color Latch 24, all of which are inputs to Fill Unit 62 in FIG. 7. R/Wn is placed in Write Mode; /FOE is brought low to place the output of Fill Unit 62 on the memory bus; and /CS is strobed to write the output of Fill Unit 62 back into Memory Array 70.

A memory-to-shift-register transfer is shown in FIG. 18a. Row Address Latch 20 in FIG. 2 is set to the address of the desired row to be transferred. R/Wn is set to put Memory Array 70 in FIG. 7 into the Read mode; /CS is brought low to read the data and place it on the data bus; and SR_R/Wn is set to make Shift Register 63 in FIG. 7 ready to accept the data. After the data are available, /SRTFR is strobed to write the data into Shift Register 63. After a memory-to-shift-register transfer is performed, the data in Shift Register 63 in FIG. 7 are shifted out serially by asserting /Sden to enable the data and then applying serial clock SCLK. This is shown in FIG. 18c.

A shift-register-to-memory transfer is shown in FIG. 18b. Row Address Latch 20 in FIG. 2 is set to the address of the desired row to receive the transfer. R/Wn is set to put Memory Array 70 in FIG. 7 into the Write mode; SR_R/Wn is set to place Shift Register 63 in FIG. 7 in the Read Mode; and /SRTFR is brought low to place the parallel output data of Shift Register 63 on the data bus. After the data is available, /CS is strobed to write the data into Memory Array 70.

One of the uses of a shift-register-to-memory transfer cycle is to set a large number of rows to the same data. This is accomplished by first using a Flash-Fill operation to set a row in Memory Array 70 to a predetermined value, then performing a memory-to-shift-register operation to load the data into Shift Register 63. Once the data is in the Shift Register, shift-register-to-memory transfers are used to transfer the data into the required memory array rows. This method may be used, for example, to clear a display buffer because it takes fewer cycles than would be required by using Flash-Fill operations.

Figure 19:
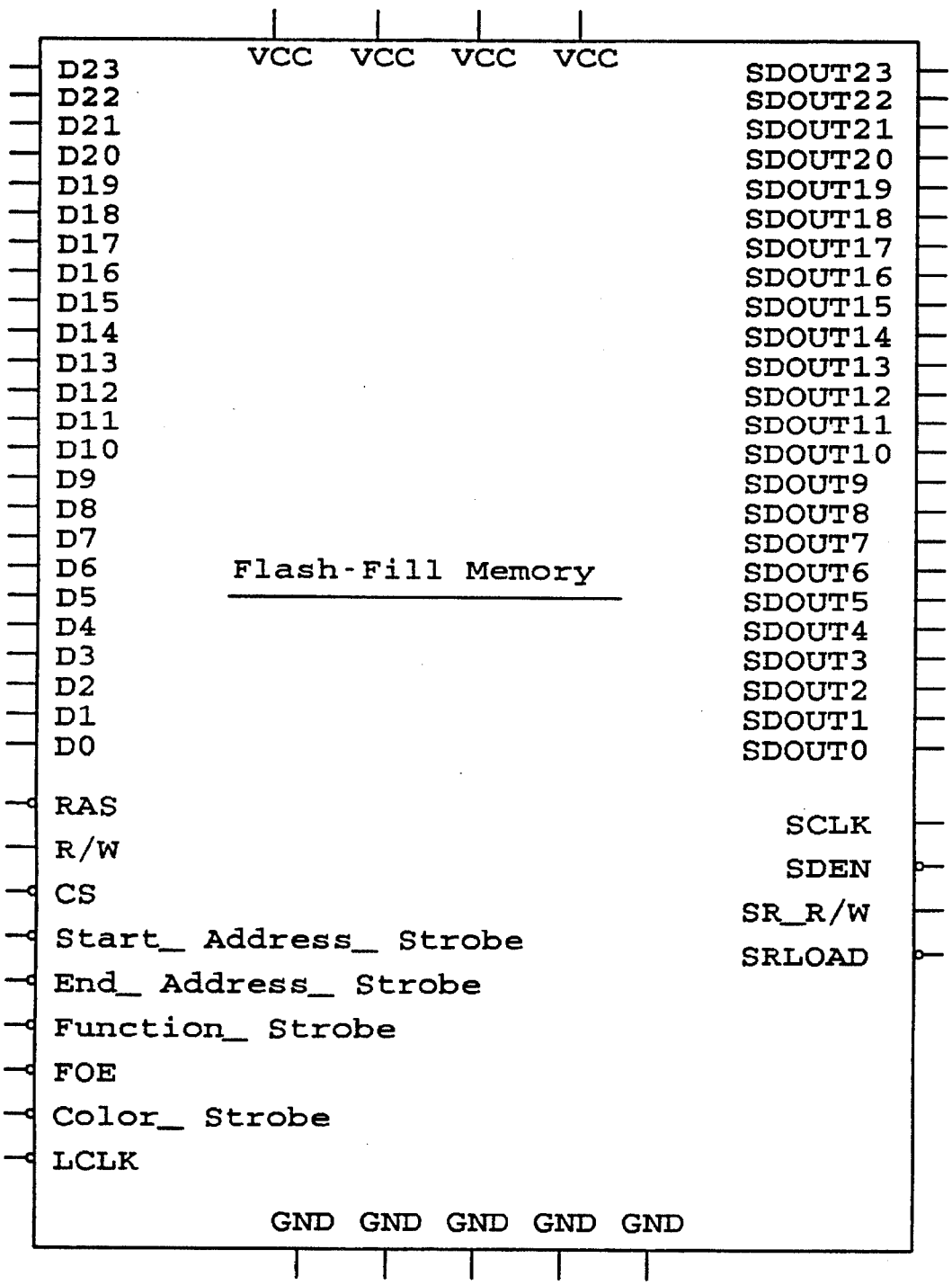
FIG. 19 is a schematic block symbol for the present invention.

The circuit symbol for the present invention is shown in FIG. 19. A simplified version of the circuit symbol for the present invention is shown as Flash-Fill Memory 212 in FIG. 20.

Figure 20:
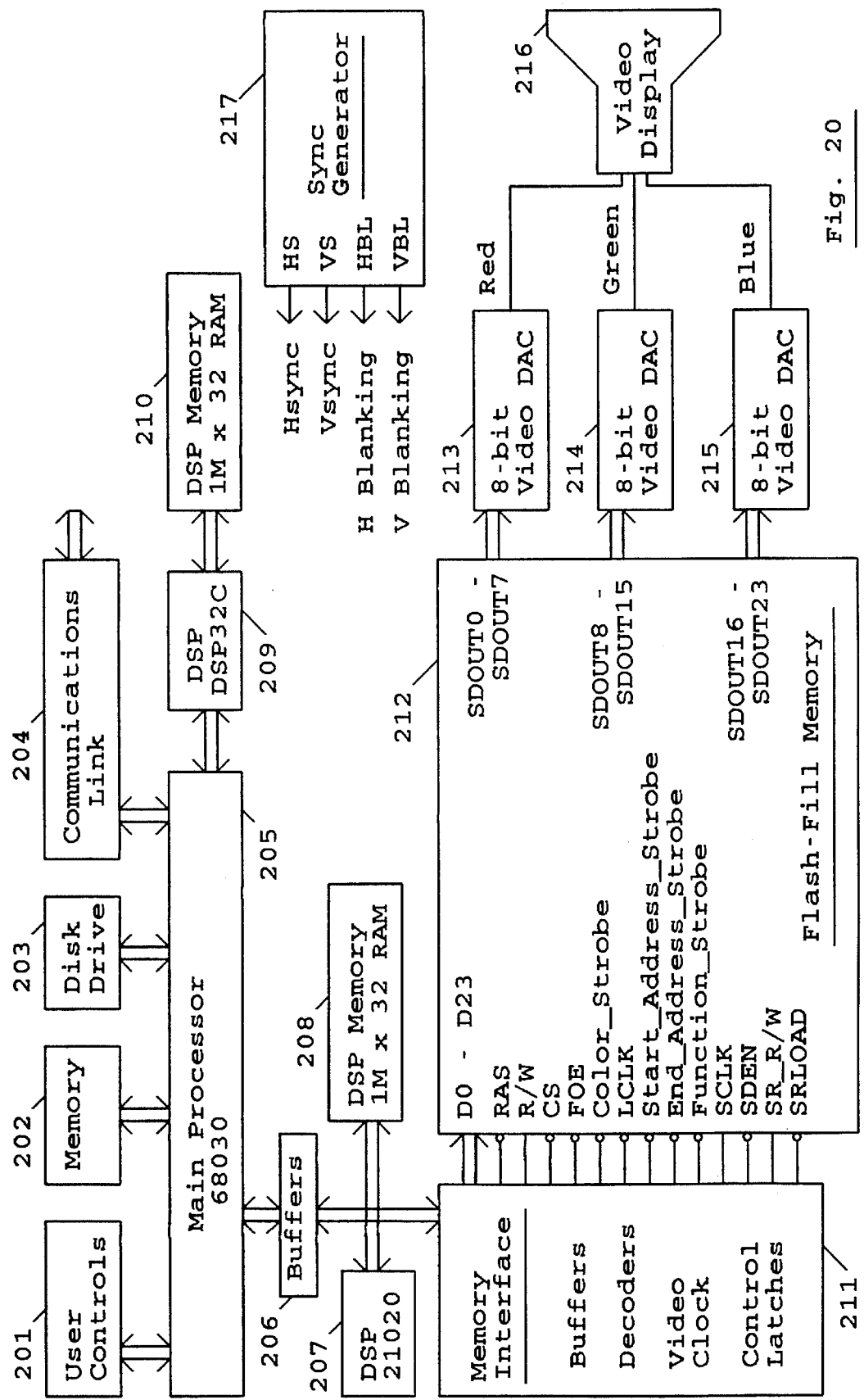
FIG. 20 is a block diagram for a typical system using 3 D graphics for a flight simulator.

An example of a typical system that would use the present invention is the flight simulator shown in FIG. 20. Main Processor 205 has its own Memory 202 which may consist of a combination of conventional static, dynamic, and read-only memory. It also has access to Disk Drive 203 which may be a Hard Disk Drive, a Floppy Disk Drive, or a CD ROM Drive, all of standard design. Main Processor 205 also interacts with User Controls 201 which consist of switch inputs, potentiometer inputs, light control outputs, and flight controls. For a realistic simulation the flight controls should be of the force feedback type where Main Processor 205 reads the position of the flight control position and/or user force and controls the force on the control felt by the user.

Main Processor 205 controls a separate processing system consisting of DSP 209 and DSP Memory 210. The purpose of this separate processing system is to perform the math that represents the aerodynamics of the aircraft and calculate the aircraft's position and heading. Main Processor 205 reads User Controls 201 and passes the data to DSP 209 which, as part of the simulation, calculates the forces that the user should feel on the controls and passes that information through Main Processor 205 back to User Controls 201.

Main Processor 205 also controls Communications Link 204 so that two or more simulators may be linked.

The aircraft's heading and position calculated by DSP 209 are passed by Main Processor 205 to DSP 207 through Buffers 206 which thereafter allow DSP 207 to operate independently of Main Processor 205.

DSP 207 is connected to its own memory, DSP Memory 208, which contains the 3 D terrain information and the library of 3 D objects such as buildings, other aircraft, and vehicles such as tanks. DSP 207 performs the 3 D transformations and 2 D projections and creates a list of polygons to be displayed. DSP 207 also calculates the Start and End addresses for the polygons and sends this information through Memory Interface 211 to Flash-Fill Memory 212. Memory Interface 211 contains the buffers, decoders, control latches, and video clock for controlling Flash-Fill Memory 212.

The Serial Data produced by Flash-Fill Memory 212 drive 8-bit Video DACs 213, 214, and 215 which produce the Read, Green, and Blue video signals for Video Display 216. Sync Generator 217 produces the synchronization signals required for a raster scan video display.

While preferred embodiments of the present invention have been shown, it is to be expressly understood that modifications and changes may be made thereto and that the present invention is set forth in the following claims.

I claim:

1. An apparatus for addressing and modifying display information for display on a display screen, said apparatus comprising:

(a) a row addressable memory for storing a plurality of lines of image data, said row addressable memory for receiving a row address, range data, and manipulation data, said range data defining a portion of image data at said row address to be modified according to said manipulation data;

(b) row address circuitry for selecting a particular row in said row addressable memory; and (c) a plurality of circuit stages for accessing said row of image data, each circuit stage comprising a compare unit and a bit processing unit for each bit plane of said row addressable memory, said compare unit comprising:

(i) a first range circuit for comparing a first data of said range data with a fixed address corresponding to said circuit stage;

(ii) a second range circuit for comparing a second data of said range data with said fixed address; and (iii) a first logic circuit responsive to outputs of said first range circuit and said second range circuit for determining if said fixed address of said circuit stage is within said range data; and (d) said bit processing unit comprising a second logic circuit, responsive to said first logic circuit, for modifying data from said row of image data according to said manipulation data provided said fixed address of said circuit stage is within said range data.

2. An apparatus as described in claim 1 wherein said manipulation data comprises color data and logic function data and further comprising a memory device for storing said row of image data of said particular row for access by said plurality of circuit stages, said memory device coupled to said plurality of circuit stages.

3. An apparatus as described in claim 2 wherein said address range, as a maximum size, corresponds to a row of said row addressable memory corresponding to a line of said display screen.

4. An apparatus as described in claim 2 wherein said plurality of circuit stages comprise a fill unit.

5. An apparatus as described in claim 2 wherein said first range circuit is a comparator and wherein said second range circuit is a comparator.

6. An apparatus according to claim 5 wherein each input gate of said first range circuit for an input bit of said fixed address having a logic low value comprises an AND gate whose inputs comprise a corresponding bit from said first data of said range data and an output of a previous comparator gate of lesser weight, and wherein each input gate for said input bit of said fixed address having a logic high value comprises an OR gate whose inputs comprise said corresponding bit from said first data of said range data and said output of said previous comparator gate of lesser weight.

7. An apparatus according to claim 6 wherein each input gate of said second range circuit for an input bit of said fixed address having a logic low value comprises an AND gate whose inputs comprise a corresponding bit from said second data of said range data and an output of a previous comparator gate of lesser weight, and wherein each input gate for said input bit of said fixed address having a logic high value comprises an OR gate whose inputs comprise said corresponding bit from said second data of said range data and said output of said previous comparator gate of lesser weight.

8. An apparatus for addressing and modifying display information for display on a screen, said apparatus comprising:

(a) a row addressable memory for storing a plurality of lines of information, said row addressable memory for receiving a row address, color data, range data, and logic function data, said range data defining a portion of data at said row address to be modified according to said color data and said logic function data;

(b) row address circuitry for selecting a particular row in said row addressable memory for access of a row of data of said particular row;

(c) a data memory for storing said row of data of said particular row;

(d) a plurality of circuit stages for accessing said row of data, each circuit stage comprising a range compare unit and a bit processing unit for each bit plane of said row addressable memory, said range compare unit comprising:

(i) a first range circuit for comparing a first data of said range data with a fixed address corresponding to said circuit stage;

(ii) a second range circuit for comparing a second data of said range data with said fixed address; and (iii) a first logic circuit for combining outputs of said first range circuit and said second range circuit for determining if said fixed address of said circuit stage is within said range data;

(e) said bit processing unit comprising a second logic circuit, responsive to said first logic circuit, for modifying data from said data memory according to said logic function data and said color data provided said fixed address of said circuit stage is within said range data.

9. An apparatus as described in claim 8 wherein said address range, as a maximum size, corresponds to a row of said row addressable memory corresponding to a line of said screen.

10. An apparatus as described in claim 8 wherein said plurality of circuit stages comprise a fill unit.

11. An apparatus as described in claim 8 wherein said first range circuit is a comparator and wherein said second range circuit is a comparator.

12. An apparatus according to claim 11 wherein each input gate of said first range circuit for an input bit of said fixed address having a logic low value comprises an AND gate whose inputs comprise a corresponding bit from said first data of said range data and an output of a previous comparator gate of lesser weight, and wherein each input gate for said input bit of said fixed address having a logic high value comprises an OR gate whose inputs comprise said corresponding bit from said first data of said range data and said output of said previous comparator gate of lesser weight.

13. An apparatus according to claim 12 wherein each input gate of said second range circuit for an input bit of said fixed address having a logic low value comprises an AND gate whose inputs comprise a corresponding bit from said second data of said range data and an output of a previous comparator gate of lesser weight, and wherein each input gate for said input bit of said fixed address having a logic high value comprises an OR gate whose inputs comprise said corresponding bit from said second data of said range data and said output of said previous comparator gate of lesser weight.

14. In a device comprising a display screen and a display screen controller, a method of addressing and modifying display information for display on said display screen, said method comprising the steps of:

(a) storing a plurality of lines of information into a row addressable memory;

(b) transferring to said row addressable memory a row address, color data, range data, and logic function data, wherein said range data defines a portion of data at said row address to be modified according to said color data and said logic function data;

(c) selecting a row of data corresponding to a particular row in said row addressable memory using row address circuitry;

(d) accessing said row of data by a plurality of circuit stages, each circuit stage comprising a range compare unit and a bit processing unit for each bit plane of said row addressable memory, said range compare unit performing the steps of:

(i) comparing a first address designator of said range data with a fixed address corresponding to said circuit stage using a first range circuit;

(ii) comparing a second address designator of said range data with said fixed address using a second range circuit; and (iii) responsive outputs of said first range circuit and said second range circuit, determining if said fixed address of said circuit stage is within said range data;

(e) modifying data from said row of data according to said logic function data and said color data provided said fixed address of said circuit stage is within said range data, said step (e) of modifying responsive to said step of determining and performed by a second logic circuit of said bit processing unit.

15. A method of addressing and modifying display information as described in claim 14 wherein said address range, as a maximum size, corresponds to a row of said row addressable memory corresponding to a line of said screen.

16. A method of addressing and modifying display information as described in claim 14 wherein said plurality of circuit stages comprise a fill unit.

17. A method of addressing and modifying display information as described in claim 14 wherein said first range circuit is a comparator and wherein said second range circuit is a comparator.

18. A method of addressing and modifying display information as described in claim 17 wherein said step of comparing a first address designator of said range data with a fixed address comprises the steps of:

for an input bit of said fixed address having a logic low value, feeding a corresponding bit from said first address designator of said range data and an output of a previous comparator gate of lesser weight to an AND gate;

for said input bit of said fixed address having a logic high value, feeding a corresponding bit from said first address designator of said range data and said output of said previous comparator gate of lesser weight to an OR gate.

19. An method of addressing and modifying display information as described in claim 18 wherein said step of comparing a second address designator of said range data with a fixed address comprises the steps of:

for an input bit of said fixed address having a logic low value, feeding a corresponding bit from said second address designator of said range data and an output of a previous comparator gate of lesser weight to an AND gate; and for said input bit of said fixed address having a logic high value, feeding a corresponding bit from said second address designator of said range data and said output of said previous comparator gate of lesser weight to an OR gate.

* * * * *